(12) United States Patent
Varatharajah et al.

(10) Patent No.: US 12,183,944 B2
(45) Date of Patent: *Dec. 31, 2024

(54) BATTERY HOUSING

(71) Applicants: CPS Technology Holdings LLC, New York, NY (US); Clarios Germany GmbH & Co. KG, Hannover (DE)

(72) Inventors: Arunraj Varatharajah, Menomonee Falls, WI (US); Deepan Chakkaravarthi Bose, Milwaukee, WI (US); Reynaldo Mora Arce, Glendale, WI (US); Ornwasa Traisigkhachol, Ronnenberg (DE); Fabio F. Peluso, Cedarburg, WI (US); Jeffrey L. Troxel, Menomonee Falls, WI (US)

(73) Assignees: CPS Technology Holdings LLC, New York, NY (US); Clarios Germany GmbH & Co. KG, Hannover (DE)

(*) Notice: Subject to any disclaimer, the term of this patent is extended or adjusted under 35 U.S.C. 154(b) by 46 days.

This patent is subject to a terminal disclaimer.

(21) Appl. No.: 18/100,901

(22) Filed: Jan. 24, 2023

(65) Prior Publication Data

US 2023/0178846 A1 Jun. 8, 2023

Related U.S. Application Data

(63) Continuation of application No. 16/481,410, filed as application No. PCT/US2018/015523 on Jan. 26, 2018, now Pat. No. 11,569,545.

(Continued)

(51) Int. Cl.
*H01M 50/383* (2021.01)
*H01M 4/73* (2006.01)
(Continued)

(52) U.S. Cl.
CPC .......... *H01M 50/383* (2021.01); *H01M 4/73* (2013.01); *H01M 50/10* (2021.01);
(Continued)

(58) Field of Classification Search
CPC ...... H01M 50/383; H01M 4/73; H01M 50/10; H01M 50/147; H01M 50/20;
(Continued)

(56) References Cited

U.S. PATENT DOCUMENTS

| | | |
|---|---|---|
| 1,922,082 A | 8/1933 | Dunzweiler |
| 3,871,924 A | 3/1975 | DeMattle et al. |

(Continued)

FOREIGN PATENT DOCUMENTS

| | | |
|---|---|---|
| CA | 2090817 A1 | 3/1993 |
| CN | 101794869 A | 12/2011 |

(Continued)

OTHER PUBLICATIONS

International Search Report and Written Opinion of the International Searching Authority dated Mar. 29, 2018 for Intl. Appln, No. PCT/US2018/015523, 32 pgs.

(Continued)

*Primary Examiner* — Matthew T Martin
*Assistant Examiner* — Bartholomew A Hornsby
(74) *Attorney, Agent, or Firm* — Boardman & Clark LLP

(57) ABSTRACT

Disclosed is a battery comprising a cover; a housing having a base, two side walls, and two end walls; a cell wall spanning between the first and second side walls defining two cells; a battery element provided within a cell, the battery element having a bottom; an element bottom gap, the element bottom gap defined in a first and second dimension by the cell width and length, and a third dimension by the distance between the base and bottom of the battery element.

20 Claims, 28 Drawing Sheets

Related U.S. Application Data

(60) Provisional application No. 62/454,494, filed on Feb. 3, 2017, provisional application No. 62/451,623, filed on Jan. 27, 2017.

(51) Int. Cl.
| | | |
|---|---|---|
| *H01M 50/10* | (2021.01) | |
| *H01M 50/147* | (2021.01) | |
| *H01M 50/20* | (2021.01) | |
| *H01M 50/204* | (2021.01) | |
| *H01M 50/271* | (2021.01) | |
| *H01M 50/30* | (2021.01) | |
| *H01M 50/529* | (2021.01) | |

(52) U.S. Cl.
CPC ......... *H01M 50/147* (2021.01); *H01M 50/20* (2021.01); *H01M 50/204* (2021.01); *H01M 50/271* (2021.01); *H01M 50/394* (2021.01); *H01M 50/529* (2021.01)

(58) Field of Classification Search
CPC ............. H01M 50/204; H01M 50/271; H01M 50/394; H01M 50/529
See application file for complete search history.

(56) References Cited

U.S. PATENT DOCUMENTS

| | | |
|---|---|---|
| 3,957,056 A | 5/1976 | Comben |
| 4,121,017 A | 10/1978 | Dougherty et al. |
| 4,444,853 A | 4/1984 | Halsall et al. |
| 4,724,190 A | 2/1988 | Siga et al. |
| 4,729,933 A | 3/1988 | Oswald |
| 4,742,611 A | 5/1988 | Meadows et al. |
| D299,639 S | 1/1989 | Anderson et al. |
| 4,857,422 A | 8/1989 | Stocchiero |
| 4,883,728 A | 11/1989 | Witehira |
| 5,001,022 A | 3/1991 | Wheadon |
| 5,004,129 A | 4/1991 | Loch et al. |
| 5,278,002 A | 1/1994 | Hiers |
| 5,492,779 A | 2/1996 | Ronning |
| 5,637,419 A | 6/1997 | Hooke et al. |
| 6,090,502 A | 7/2000 | Ingram et al. |
| 6,300,005 B1 | 10/2001 | Kump |
| 6,468,318 B1 | 10/2002 | Meadows et al. |
| 6,572,999 B1 | 6/2003 | Stocchiero |
| 6,593,027 B1 | 7/2003 | Osterhart et al. |
| 6,709,783 B2 | 3/2004 | Ogata et al. |
| 6,929,882 B1 | 8/2005 | Carter |
| 7,879,485 B2 | 2/2011 | Yoon et al. |
| D643,811 S | 8/2011 | Qualls et al. |
| D665,342 S | 8/2012 | Qualls, Jr. et al. |
| 8,420,245 B2 | 4/2013 | Im et al. |
| 8,883,336 B2 | 11/2014 | Kim et al. |
| 8,956,747 B2 | 2/2015 | Itoi et al. |
| 8,993,151 B2 | 3/2015 | Mack |
| 9,048,483 B2 | 6/2015 | Nakamura et al. |
| D742,307 S | 11/2015 | DeKeuster et al. |
| 9,263,713 B2 | 2/2016 | Kim |
| D760,160 S | 6/2016 | DeKeuster et al. |
| 9,379,365 B2 | 6/2016 | Schmieder et al. |
| 9,397,364 B2 | 7/2016 | Miyazaki et al. |
| 9,496,588 B2 | 11/2016 | Nguyen et al. |
| 9,614,210 B2 | 4/2017 | DeKeuster et al. |
| 9,620,764 B2 | 4/2017 | DeKeuster |
| 11,569,545 B2 * | 1/2023 | Varatharajah ......... H01M 10/06 |
| 2003/0003354 A1 | 1/2003 | Ferreira et al. |
| 2003/0054240 A1 | 3/2003 | Aronsson |
| 2003/0072997 A1 | 4/2003 | Estreich et al. |
| 2005/0147874 A1 | 7/2005 | Andersen et al. |
| 2006/0216595 A1 | 9/2006 | Holliday et al. |
| 2013/0089775 A1 | 4/2013 | Mack |
| 2013/0207459 A1 | 8/2013 | Schroder et al. |
| 2015/0037616 A1 | 2/2015 | Wyatt et al. |
| 2015/0064543 A1 | 3/2015 | Jung |
| 2017/0125750 A1 | 5/2017 | Tsukiyoshi |

FOREIGN PATENT DOCUMENTS

| | | |
|---|---|---|
| DE | 101 03 318 A1 | 8/2001 |
| DE | 102010001533 A1 | 8/2011 |
| DE | 102011054775 A1 | 4/2013 |
| EP | 2337142 B1 | 8/2013 |
| EP | 2453502 B1 | 5/2014 |
| EP | 3076455 A4 | 5/2017 |
| FR | 2681981 B1 | 12/1993 |
| GB | 2098383 A | 11/1982 |
| JP | 3965661 B2 | 8/2007 |
| JP | 2013058355 A | 3/2013 |
| JP | 5580567 B2 | 8/2014 |
| JP | 5617765 B2 | 11/2014 |
| JP | 5939307 B2 | 6/2016 |
| JP | 2016126872 A | 7/2016 |
| JP | 6089984 B2 | 3/2017 |
| JP | 2017062958 A | 3/2017 |
| JP | 6127763 B2 | 5/2017 |
| WO | 2009/145375 A1 | 12/2009 |
| WO | 2011/029035 A2 | 3/2011 |
| WO | 2015013624 A3 | 1/2015 |
| WO | 2016/106386 A1 | 6/2016 |

OTHER PUBLICATIONS

International Preliminary Report on Patentability dated Jul. 30, 2019 for Intl.Appln. No. PCT/US2018/015523, 9 pgs.

* cited by examiner

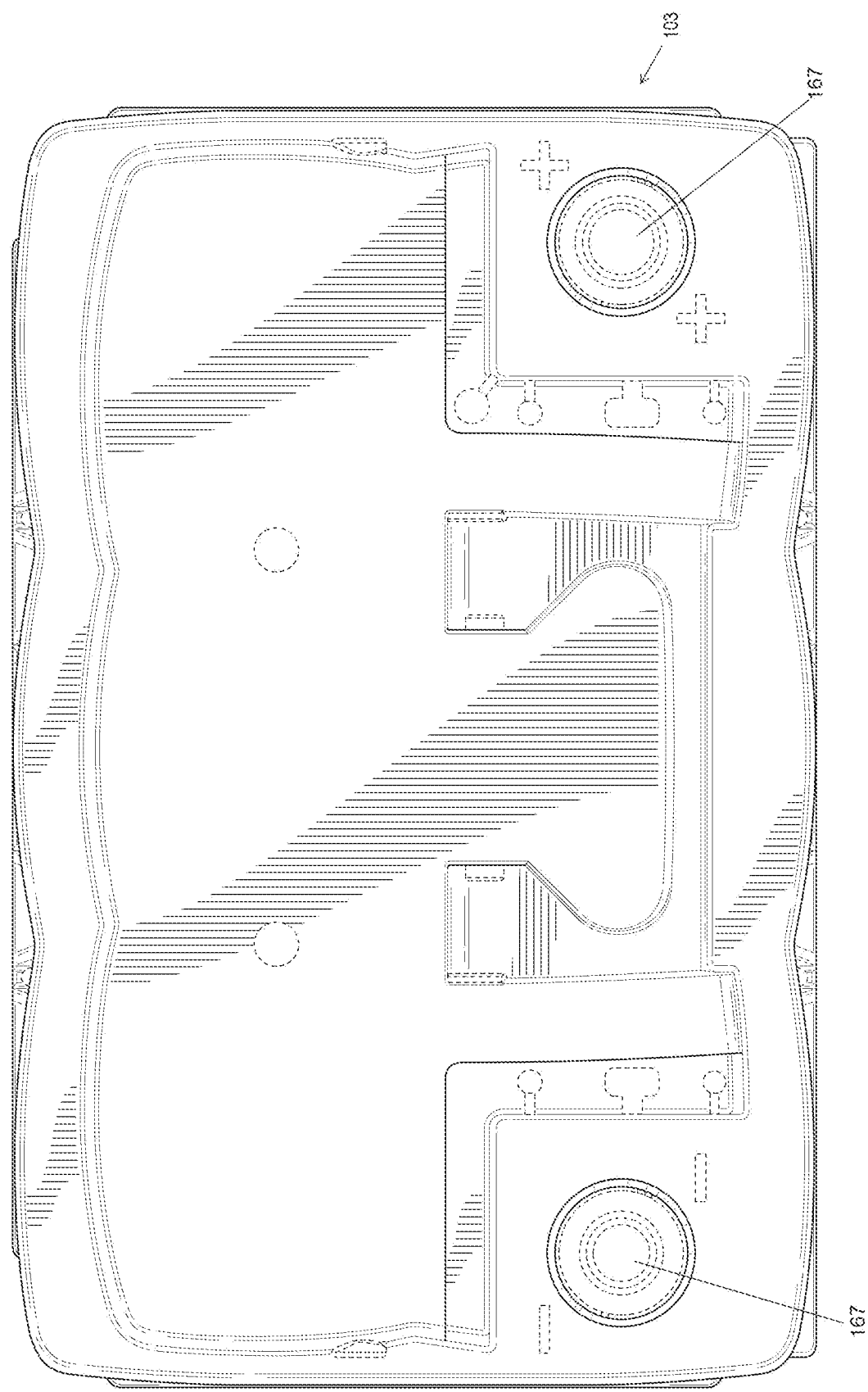

BATTERY HOUSING

PRIORITY CLAIM

This application is a Continuation of U.S. patent application Ser. No. 16/481,410, filed Jul. 26, 2019, to be issued as U.S. Pat. No. 11,569,545; which is a National Stage Entry of PCT/US2018/15523, filed Jan. 26, 2018; which claims the benefit of U.S. application 62/451,623 filed Jan. 27, 2017 and U.S. application 62/454,494 filed Feb. 3, 2017; which all are hereby incorporated by reference in their entireties.

FIELD OF INVENTION

The present disclosure relates to batteries. The present disclosure more specifically relates to batteries and housings for batteries.

BACKGROUND

The present disclosure relates to batteries (e.g., lead-acid batteries for use as automotive, commercial, industrial, and marine batteries in starting, lighting, and ignition ("SLI"), deep cycle, or other applications) as well as to batteries and housings for batteries.

It is known to provide for a battery housing for one or more battery cell elements in a flat-plate format that may be used for deep cycle, SLI, or other applications. The battery housing is designed to hold multiple cell elements for charging and discharging. Known batteries and housings have certain disadvantages.

For example, known batteries may have problems with shorting. Known batteries may likewise have certain disadvantages for performance characteristics.

SUMMARY OF THE INVENTION

A battery housing is disclosed which addresses certain issues present in known batteries. The battery housing includes a front, back, first end wall, second end wall, bottom, interior, and lid. The first and second end walls of the battery housing may be strengthened. The interior includes a number of partitions or cell walls dividing the battery housing into a number of cells, The partitions or cell walls may include a notch, recess, or cutout to allow cast-on-straps to pass directly between cell elements.

A battery including a battery housing is also disclosed. A battery element may be provided within each cell. The battery element may be comprised of a number of positive and negative battery grids, which may be separated by a separator. The battery housing may have enhanced end walls, curved side walls, recesses or cutouts in the cell dividers, and an open housing. In addition, the battery housing may include a lid or cover. The lid or cover may include one or more valve assemblies and flame arrestor pockets, as well as one or more stacking projections.

Disclosed is a battery comprising a cover; a housing having a base, two side walls, and two end walls; a cell wall spanning between the first and second side walls defining two cells; a battery element provided within a cell, the battery element having a bottom; an element bottom gap, the element bottom gap defined in a first and second dimension by the cell width and length, and a third dimension by the distance between the base and bottom of the battery element. Further disclosed is a battery comprising an element side gap, the element side gap being defined by a battery element side edge and an internal surface of the housing. Further disclosed is a battery wherein the internal surface of the housing is curved. Further disclosed is a battery wherein a cutout is provided in the cell wall and a connecting strap is provided through the cutout. Further disclosed is a battery wherein the cutout, connecting strap, and cover define a common headspace. Further disclosed is a battery wherein the common headspace is defined by a smaller connecting strap width than a cutout width. Further disclosed is a battery wherein at least one of the two end walls is a reinforced end wall. Further disclosed is a battery wherein the end wall has a thickened portion and a recessed portion.

Disclosed is a battery comprising a housing having a base, two side walls, and two end walls; a cell wall spanning between the first and second side walls defining two cells; a battery element provided within a cell, the battery element having a side and a bottom; and an element side gap, the element side gap being defined by a battery element side edge and an internal surface of the housing. Further disclosed is a battery wherein the internal surface of the housing is curved. Further disclosed is a battery wherein a cutout is provided in the cell wall and a connecting strap is provided through the cutout. Further disclosed is a battery wherein the cutout, connecting strap, and a cover define a common headspace. Further disclosed is a battery wherein the cover further comprises two valve assemblies. Further disclosed is a battery wherein at least one of the two end walls is a reinforced end wall. Further disclosed is a battery wherein the end wall has a thickened portion and a recessed portion.

Disclosed is a battery comprising: a housing having, a base, two side walls, and two end walls; a cell wall spanning between the first and second side walls defining two cells; a battery element provided within a cell, the battery element having a bottom and side edge; an element bottom gap, the element bottom gap defined in a first and second dimension by the cell width and length, and a third dimension by the distance between the base and bottom of the battery element; and an element side gap, the element side gap being defined by the battery element side edge and an internal surface of the housing. Further disclosed is a battery wherein the side walls include a convex portion and an inward slope. Further disclosed is a battery wherein the element side gap is located relative to the convex portion of the side walls. Further disclosed is a battery further comprising a cover and a common headspace. Further disclosed is a battery wherein the common headspace is defined by a cutout in the cell wall, a connecting strap, and a cover. Further disclosed is a battery wherein the element hangs from a connecting strap cast onto a plurality of lugs. Further disclosed is a battery wherein the element further comprises a separator interleaved, wrapped around, or enveloping one or more battery grids.

These and other features and advantages of various embodiments of systems and methods according to this invention are described in, or are apparent from, the following detailed description of various exemplary embodiments of various devices, structures, and/or methods according to this invention.

BRIEF DESCRIPTION OF THE FIGURES

FIG. 14 shows a top view of an exterior of a battery housing, according to various examples of embodiments.

It should be understood that the drawings are not necessarily to scale. In certain instances, details that are not necessary to the understanding to the invention or render other details difficult to perceive may have been omitted. It should be understood, of course, that the invention is not necessarily limited to the particular embodiments illustrated herein.

DETAILED DESCRIPTION

Figure 1:
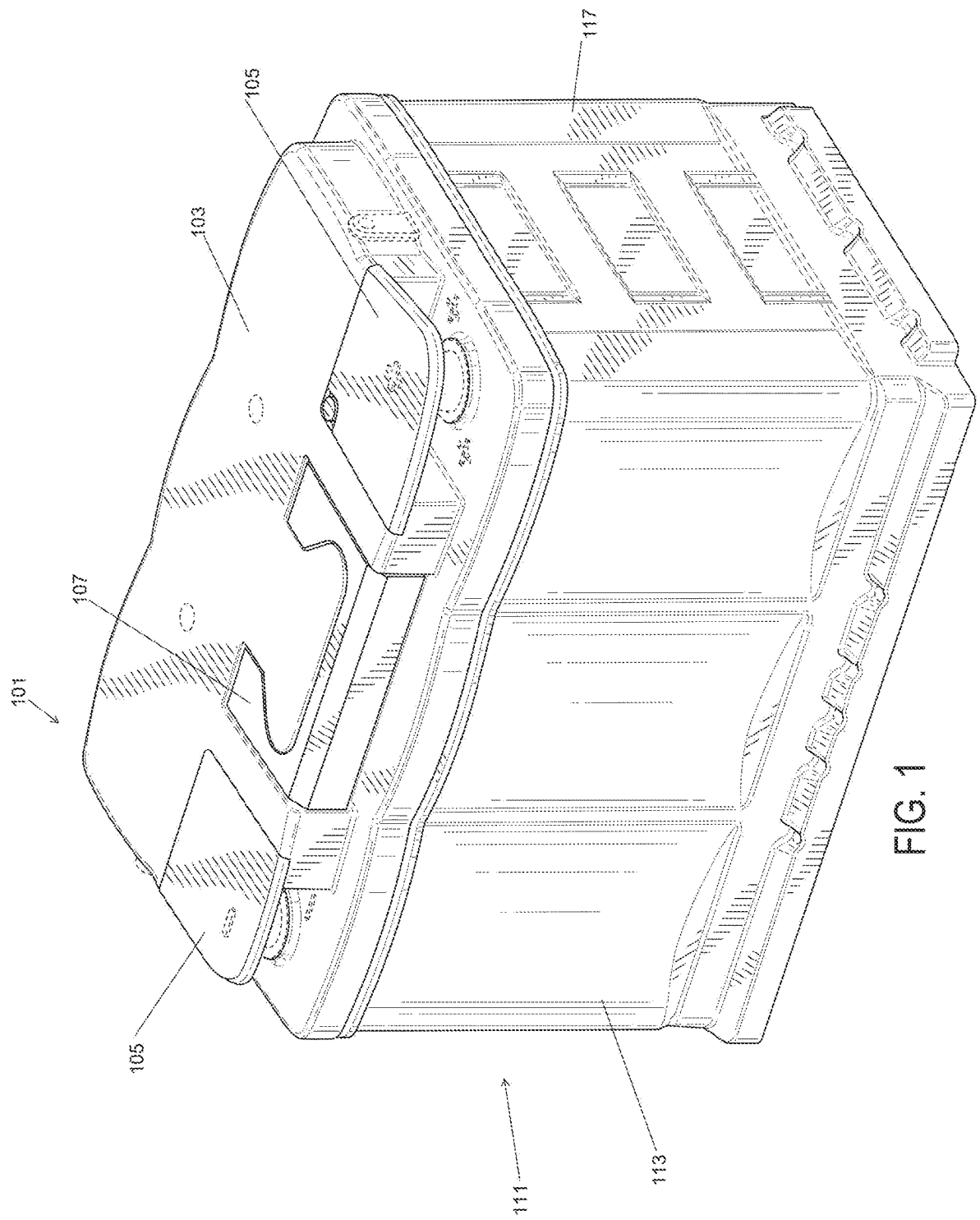
FIG. 1 shows a battery having a battery housing, according to various examples of embodiments.

FIG. 1 shows a battery 101 having a housing 111 including a cover 103, according to various examples of embodiments. The housing 111 may include, in various embodiments, two side walls 113 and two end walls 117. The end walls 117, in various embodiments, may include an enhanced wall structure which may comprise thickened 121 and recessed 123 portions. The side walls 113 may, in various embodiments, include a curved wall structure which may comprise a convex curve 115 and inward slope 116. The curved wall structure may be reflected in the shape of an internal surface 129 of the housing including an internal surface curve 130. Inside the housing 111, cell walls 125 with cutouts 127 may be provided between each cell 109.

The housing 111 may also include a cover 103. The cover 103 may include two post covers 105 and a handle 107. The cover 103 may also include one or more pockets or recesses 171 which may facilitate the installation of a valve assembly 185 (for example, one, two, or three valve assembly recesses) and one or more stacking locators 187, among other features.

Figure 2:
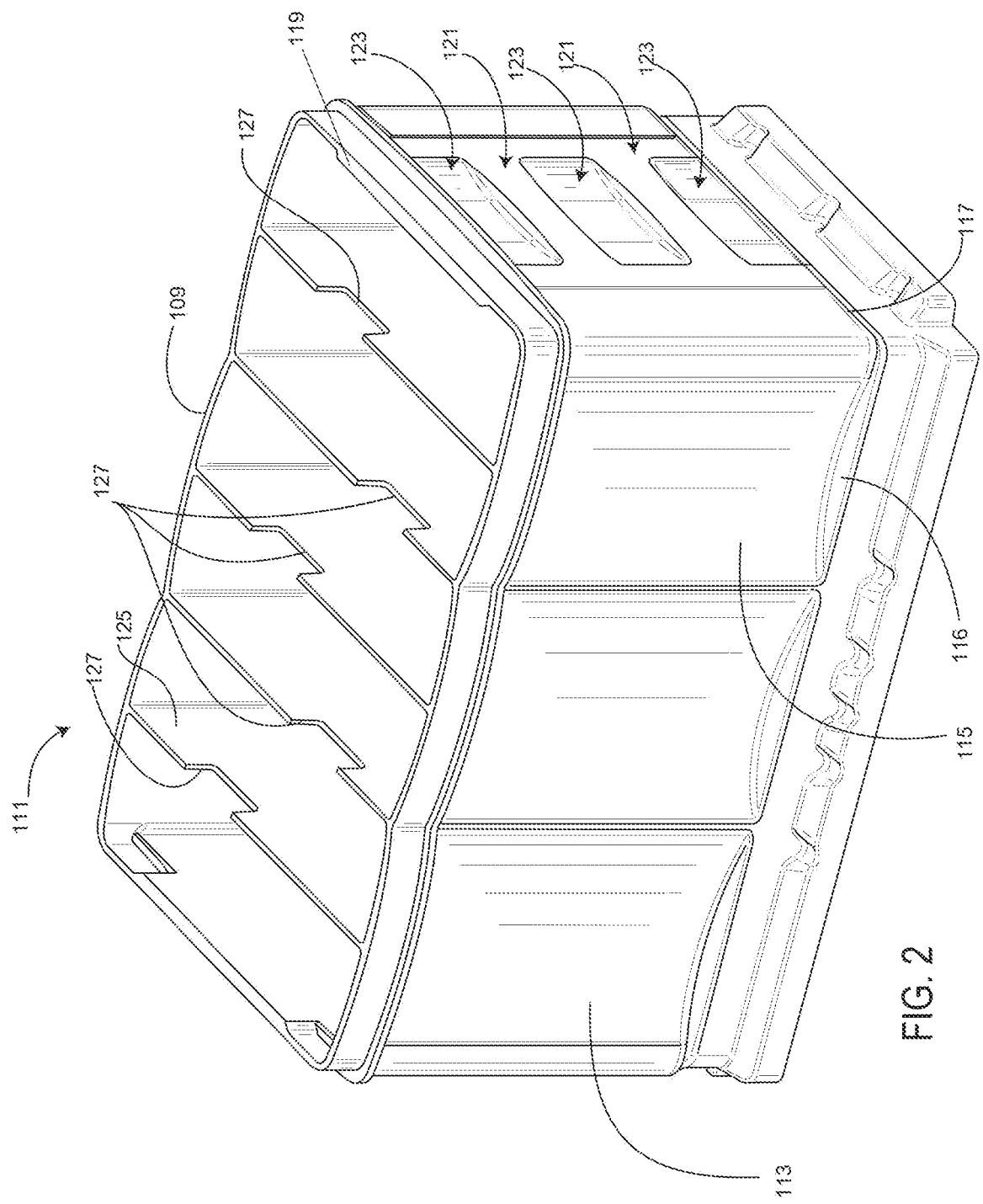
FIG. 2 shows an oblique view of a battery housing interior, according to various examples of embodiments.
Figure 3:
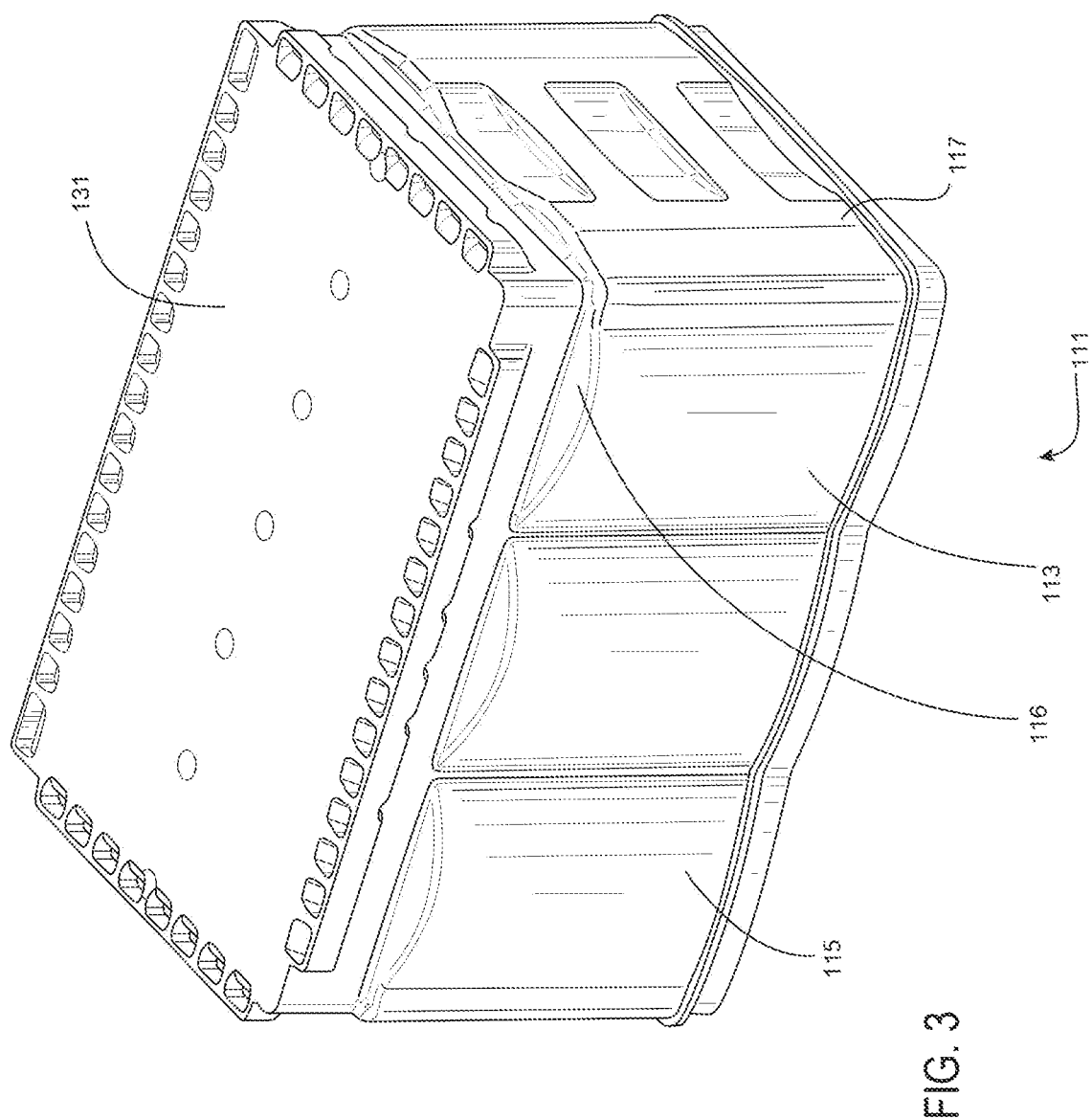
FIG. 3 shows a bottom of a battery housing, according to various examples of embodiments.

The battery housing 111 may include an enhanced end wall 117 structure which may comprise thickened portions 121 and recessed portions 123. While this description relates to providing the end walls with enhanced features, it should be understood enhancement of other walls (e.g. sidewalls 113, bottom wallbase 131, etc.) is within the scope of this disclosure. FIG. 2 shows a first perspective view of the housing 111 without a cover or lid 103. End walls 117, side walls 113, and interior partitions or cell walls 125 having notches or cutouts 127 can be seen. FIG. 3 shows a view from a bottom surface or base 131 of the housing 111. Again, an end wall 117 and a side wall 113 can be seen. The side wall 113 includes a convex curve 115 and inward slope 116 portions.

Enhanced End Wall Structure

Figure 4:
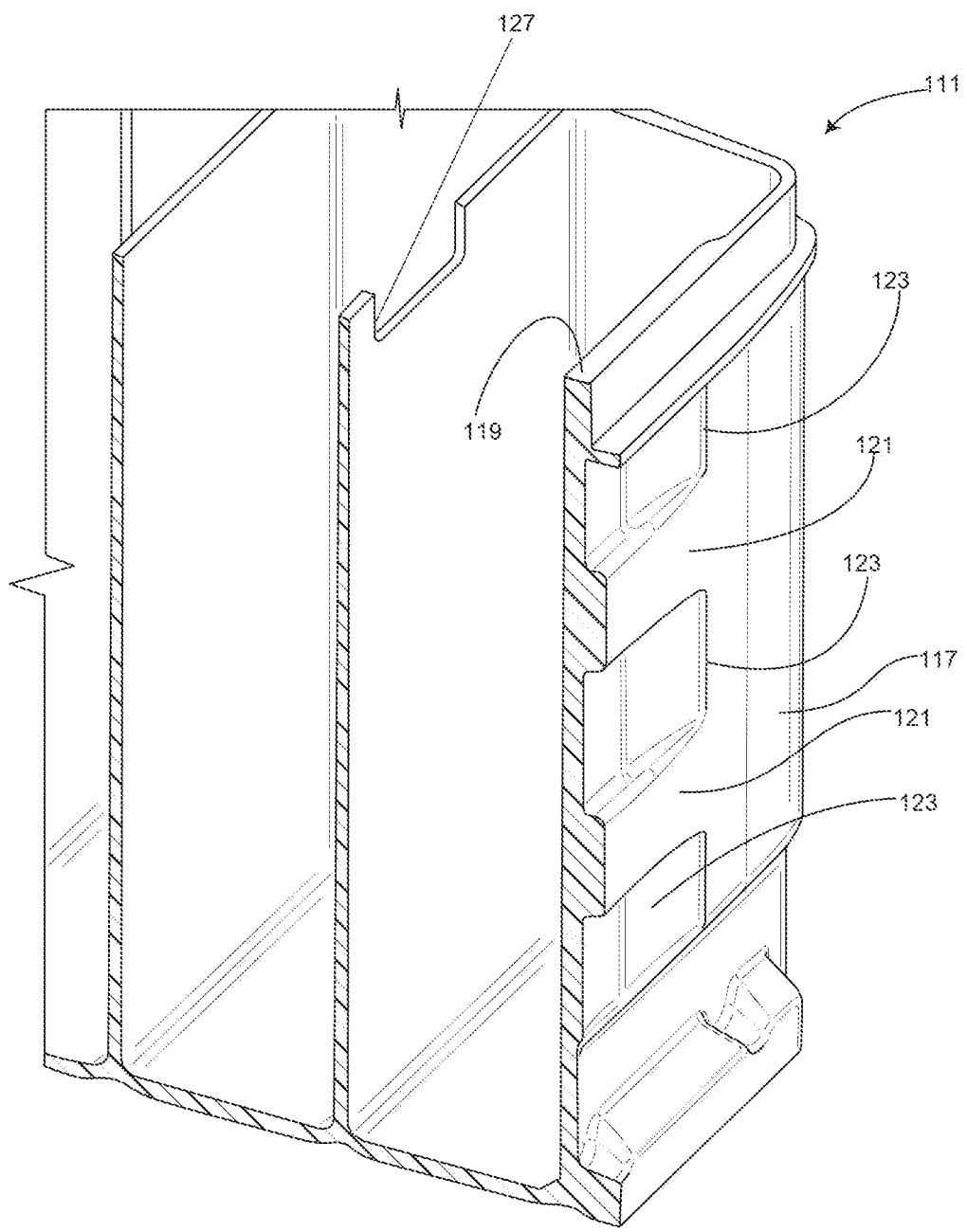
FIG. 4 shows a cutaway view of a side of a battery housing, according to various examples of embodiments.

In various embodiments, the figures can be seen to include an enhanced end wall 117 structure. This enhanced end wall 117 can be seen to include, according to various embodiments of the invention, recessed 123 and thickened 121 portions. FIG. 4 shows a cutaway of the end wall 117 showing a variance in wall thickness. In various embodiments, the end wall may include a number of cross bars or areas of thickened or enhanced material 121, and a number of sloped recesses 123 providing for variances in side wall material. As can be seen in FIGS. 2 through 4, two bars or areas of enhanced material 121 may be provided, with recesses 123 between each. However, more or less may be provided. Other patterns of enhanced material should be contemplated as within the scope of this disclosure e.g. bullseye, grid, polka-dots, or other patterns.

Figure 5:
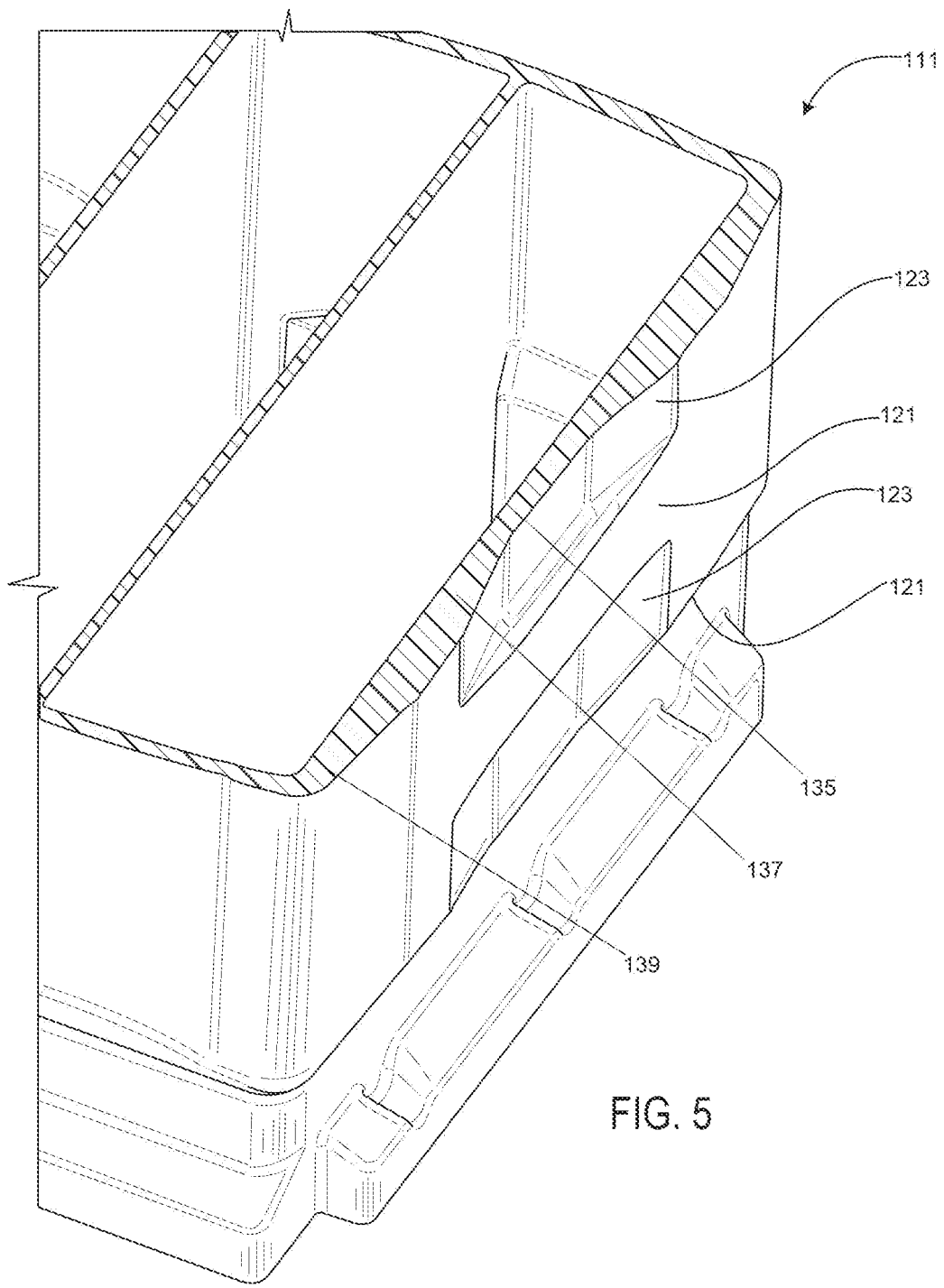
FIG. 5 shows a cutaway view of an end of an interior of a battery housing, according to various examples of embodiments.

Referring to FIG. 5, a cutaway is shown of a middle portion of the end wall 117. In various embodiments, this may be understood as a cross-section of the sloped recess portion of the enhanced end wall 117. According to various embodiments, three end wall width points are shown. A first thickness 135 may be seen in the middle of the recess, a second 137 approximately halfway between the first thickness and the side wall, and a third thickness 139 may be seen just before the side wall 113. The first thickness 135, in various embodiments, may be less than the third thickness 139 and the second thickness 137 may be larger than the third thickness 139. It may be understood the inside of the enhanced end walls (i.e. internal surface within the battery housing) may be substantially flat, according to various examples of embodiments. A top surface of the wall 119 may also, in various embodiments, include variance in material thickness. Variations acceptable to accomplishing the purposes disclosed herein may also be acceptable.

Numerous advantages may be realized by the enhanced end wall structure. For example, the end wall 117 may increase strength and enhance overall safety of the battery 101. The enhanced end walls 117 may, in various embodiments, reduce stress and deflection. Stress and deflection may, in various embodiments, be known in the art to refer to various forces on the battery housing 111 generated by the charge and discharge of the battery 101. This stress may be relative to the age of the battery.

Curved Side Wall Structure

Figure 6:
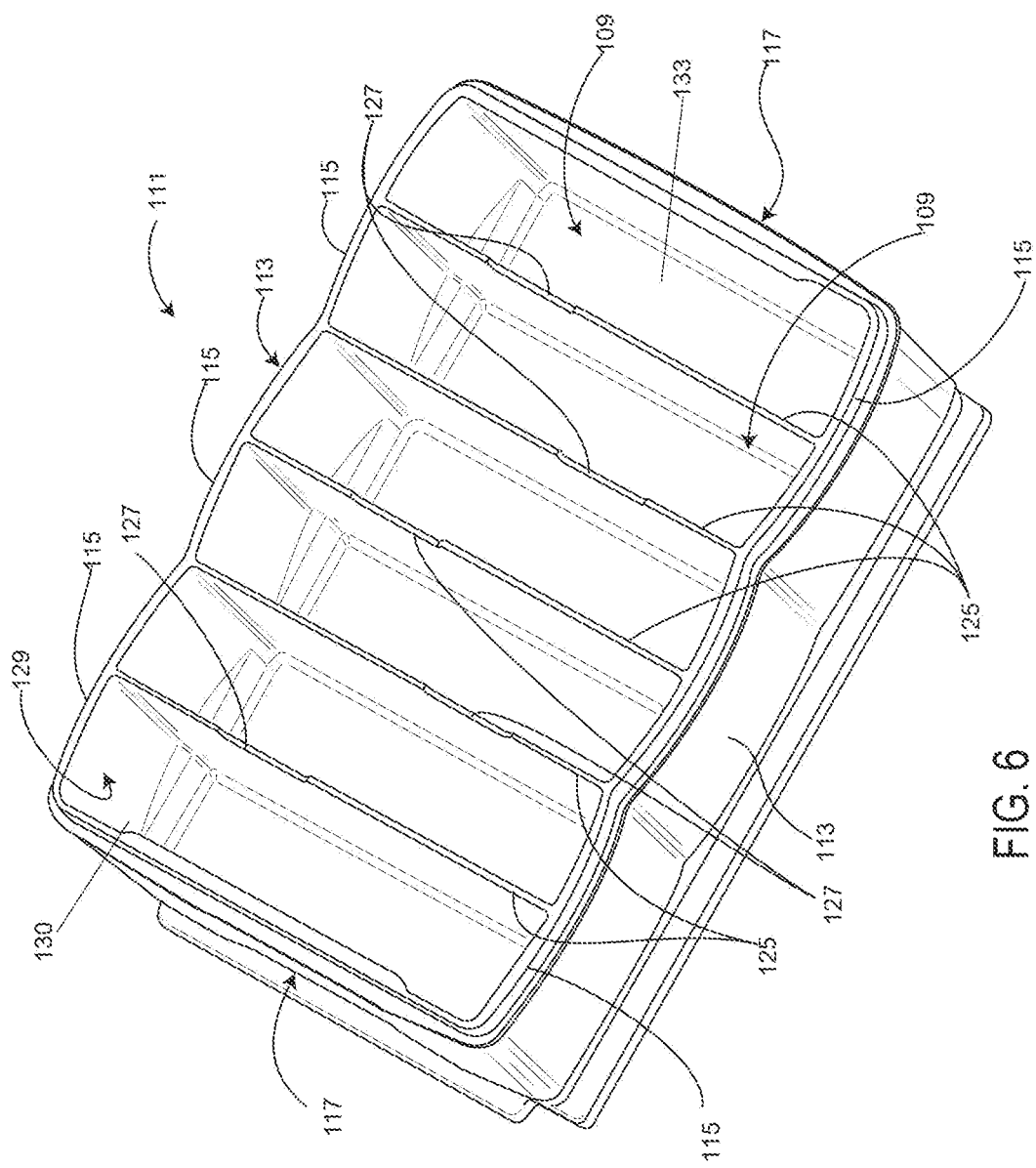
FIG. 6 shows a top view of a battery housing, according to various examples of embodiments.

Referring to FIG. 6, a curved side wall (front and back wall) 113 structure may be seen including a number of convex curves 115. The side wall 113 may likewise comprise a number of inward slopes 116. In various embodiments, three convex curves 115 are seen on each side wall 113. The first and second side wall, in various embodiments, may be a front and back of the battery 101. Each side wall 113 may have an internal surface 129 that has a curved portion 130 reflective of the curved section 115 of the side wall 113. In various embodiments, the curved section 130 of the internal surface 129 may be divided into two by a cell wall 125 creating two cells 109. The two cells may be approximately equal in size. As a result, the battery cell 109 may be curved on two sides and straight on two sides. The battery cell 109 may be further defined by a housing base 131 internal surface 133. The sidewall curved internal surface 130, in various embodiments, may not extend to the bottom of the cell cavity. Variations of wall configurations may be contemplated as within the scope of this disclosure.

Referring to FIGS. 1 through 3, the side wall 113 may have a convex curve 115 when viewed from the exterior of the battery which extends into an inward slope 116 version of the curve towards a bottom or base 131 of the housing 111 when the housing 111 is in an upright position (for example, in FIG. 2). The shape of these side walls may also be present in an interior 129 of the battery. In other words, an interior surface 129 of the side wall may likewise be curved 130. For example, FIG. 6 shows an interior including an interior surface 129 of the side walls 113. The side walls 113 within the cell may allow for a curved space (defined by the side wall curved interior portion 130). In various embodiments, if a battery element 141 is provided within the cell 109, the curved space may result in a gap 155 between the element side edge 140 and the cell wall internal surface 129, particularly, for example, in the curved portion 130. This feature 155 may be seen, according to various embodiments, in FIG. 7 and FIG. 8. This feature may be understood as an element side gap 155.

Figure 7:
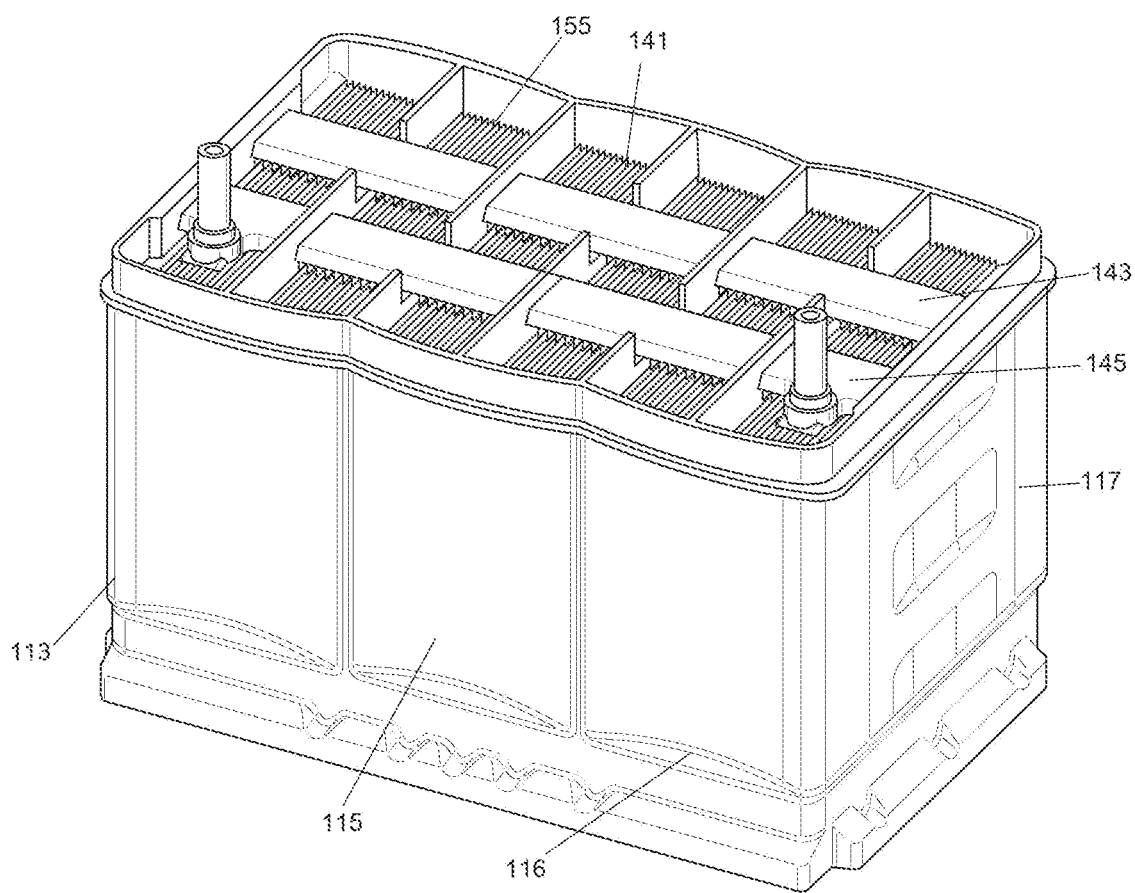
FIG. 7 shows a side view of a battery housing having cast on straps and battery elements, according to various examples of embodiments.
Figure 8:
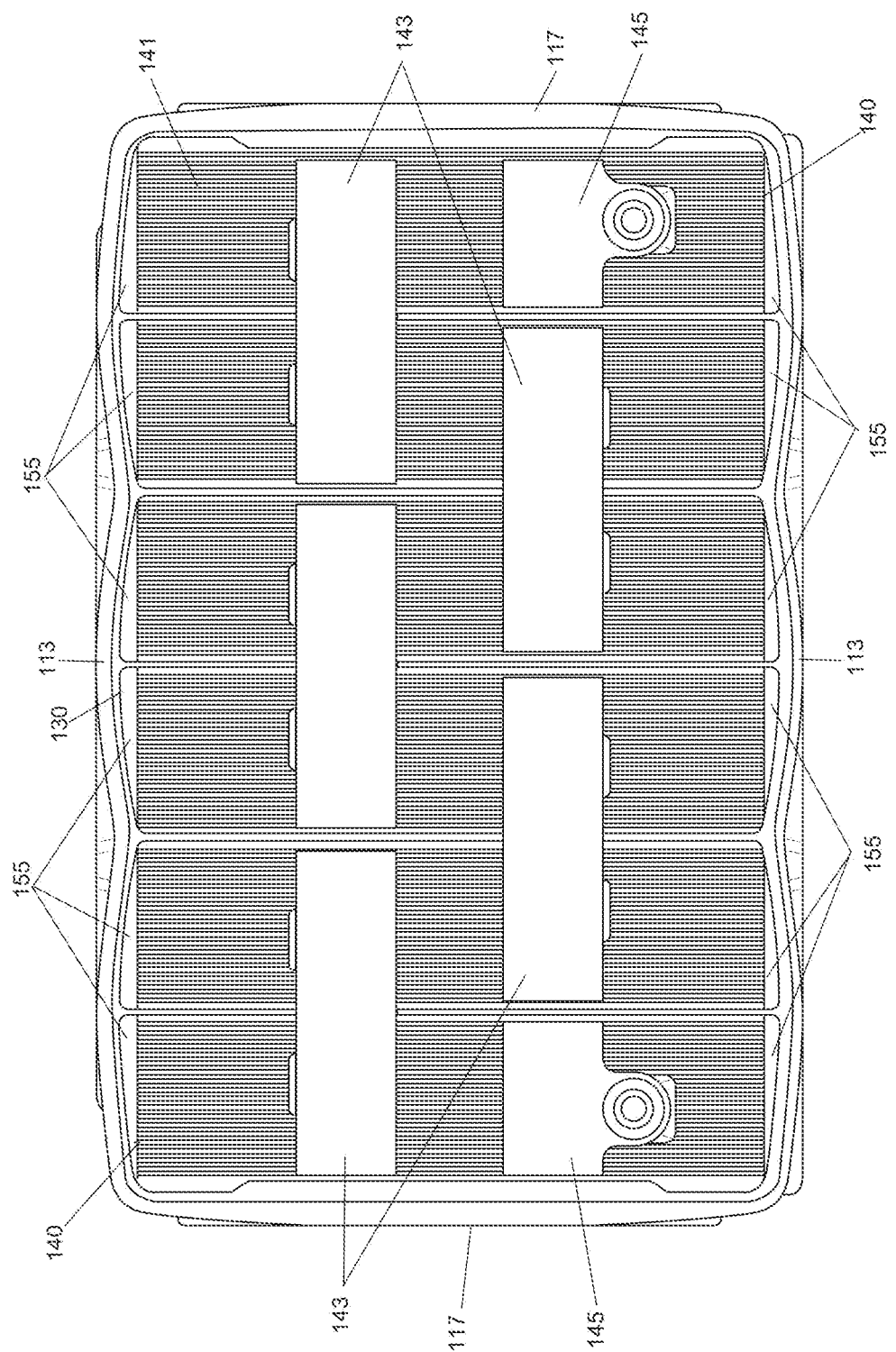
FIG. 8 shows a top view of a battery housing containing battery elements connected by cast on straps, according to various examples of embodiments.
Figure 9:
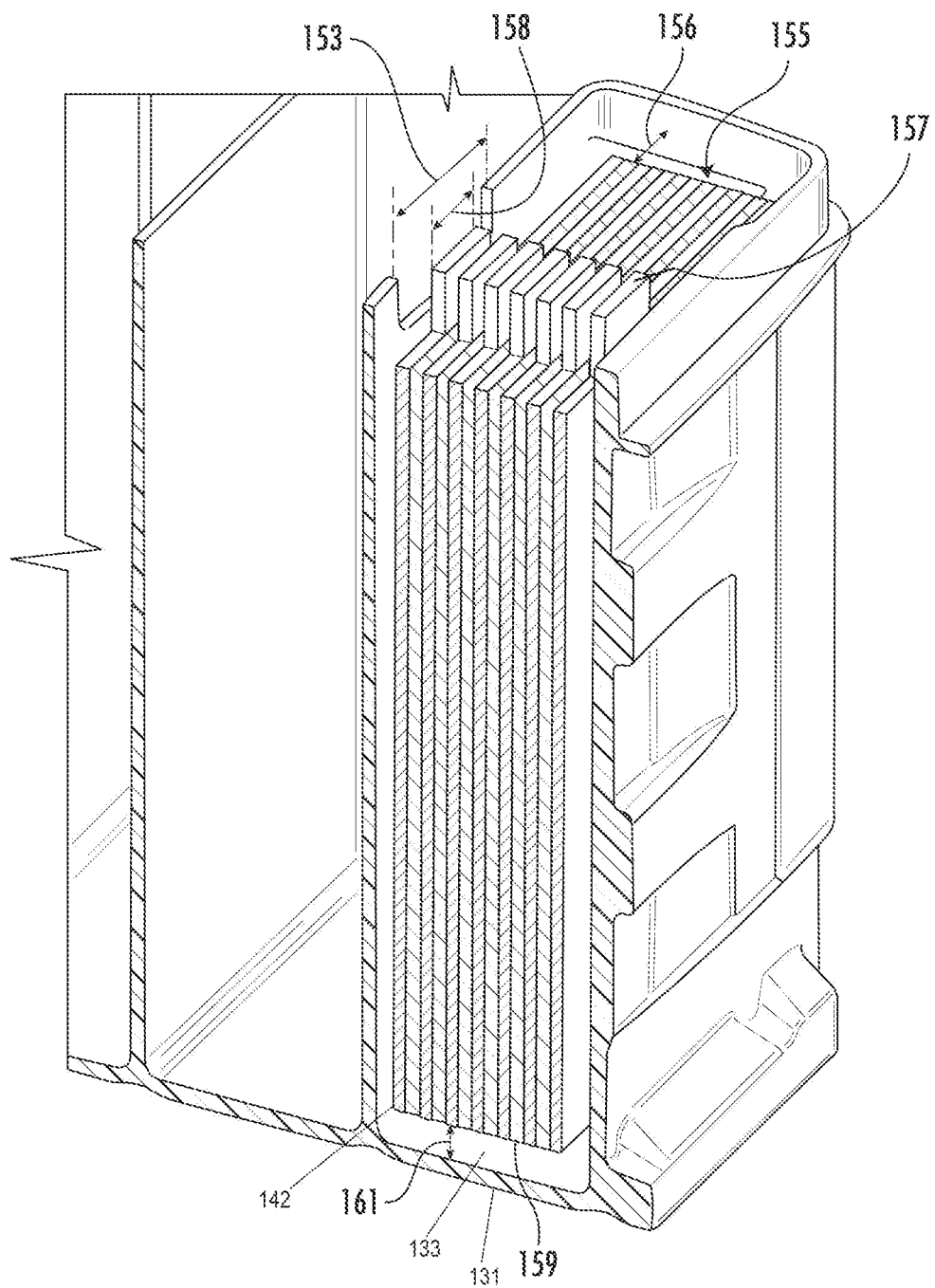
FIG. 9 shows a cutaway view of an end of a battery housing containing a battery element, according to various examples of embodiments.
Figure 10:
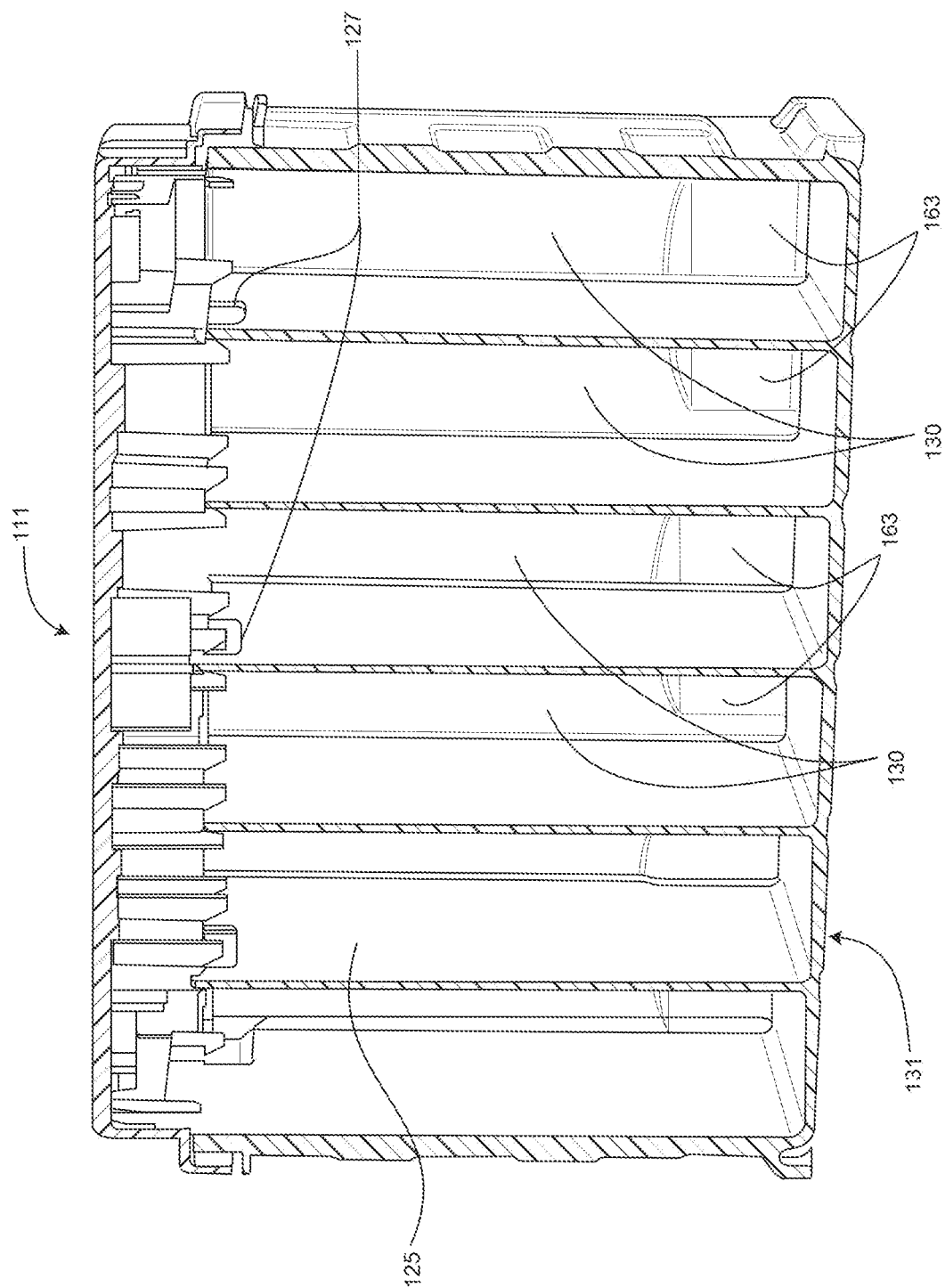
FIG. 10 shows a cutaway side view of a housing having a lid or cover, according to various examples of embodiments.
Figure 11:
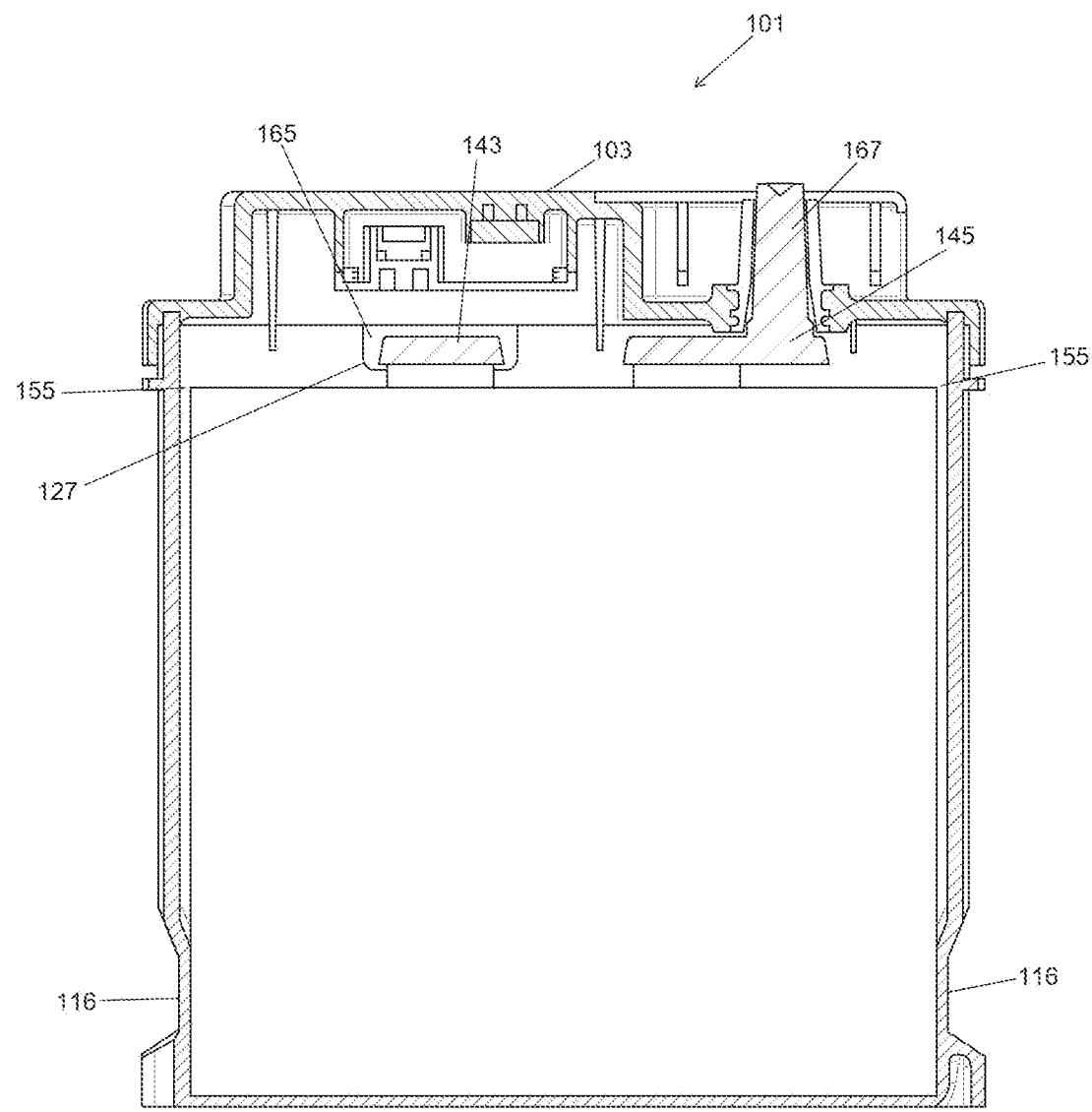
FIG. 11 shows an end cutaway view of a battery housing having a lid or cover, according to various examples of embodiments.
Figure 12:
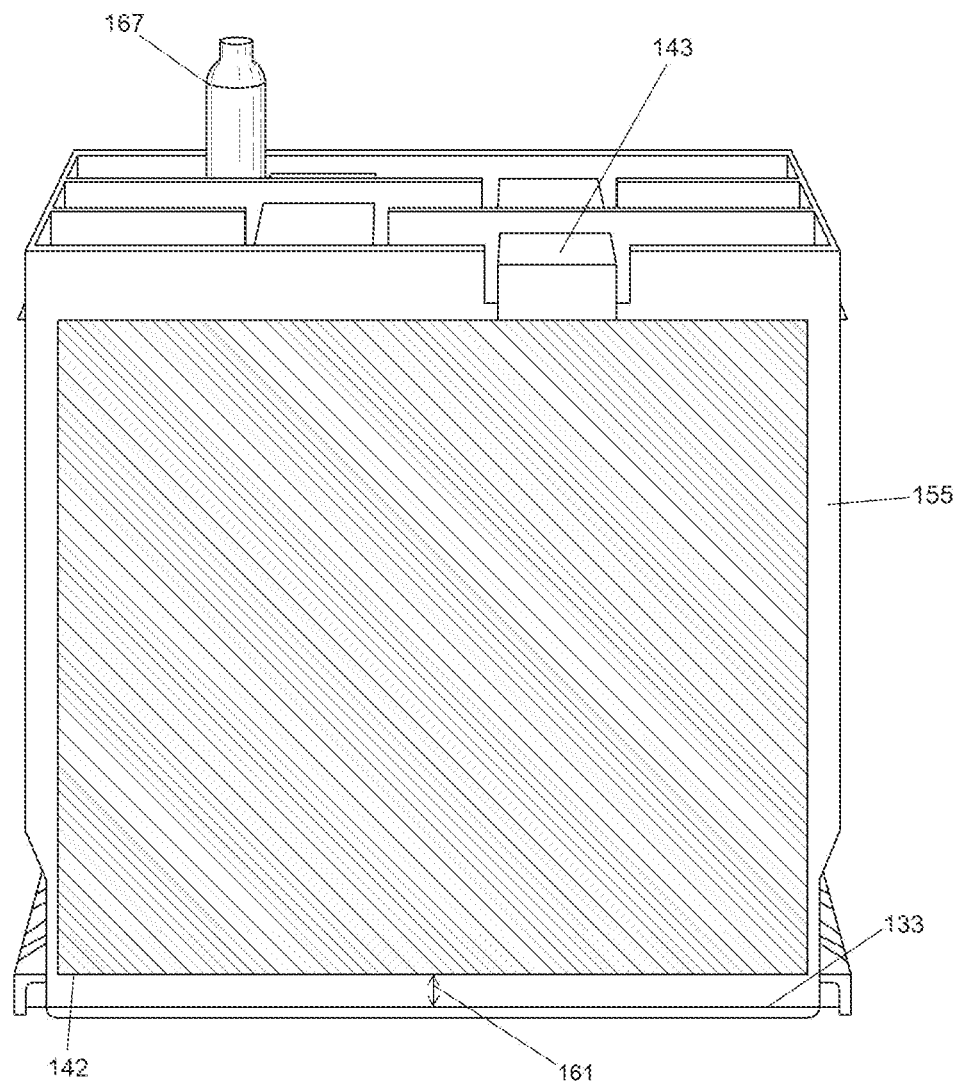
FIG. 12 shows a cutaway view of a battery housing, according to various examples of embodiments.

The curved space comprising an element side gap 155, in various embodiments, can be seen as created by a curved wall structure 130 shown in FIG. 7 and FIG. 8, and the side edge 140 of a flat-plate battery element 141. In FIG. 9, the width of this space 155 is noted as 156. Referring to FIGS. 10-13B, a tapering in the curved wall structure may be seen. In FIG. 10, a lengthwise cross-section of the housing 111 is shown. A curved portion 130 leads to an inward slope portion 163 of the internal surface of the side wall 129 may be seen towards a bottom of the housing 131. In FIG. 11, the housing may be seen in a cross-section in width-wise dimension to take on an hourglass shape the housing 111 tapering inward 116 towards a surface towards the bottom 131 of the housing. A second view of this shape is shown in FIG. 12. The element side gap 155 can be seen in both figures. This shape may be further seen in the renderings of FIGS. 13A and 13B which show first and second end walls 117 of the housing 111.

The element side gap 155, in various embodiments, may be created by the curved side wall 113; however, various other shapes beyond the curved wall shape may be contemplated as within the scope of this disclosure.

Elements and Element Bottom Gap

Referring to FIG. 9, a cutaway is shown of a battery element 141 provided within a cell 109. A battery element 141 may be comprised, in various embodiments, of a number of positive and negative battery grids with paste thereon separated by a separator 159. The battery element may also include an absorbent glass mat (AGM). The illustrated battery element does not include the cast on straps shown in FIGS. 7 and 8, however, cast on straps may connect the lugs 157. A space 161 is shown between the bottom of the battery element 142 and the base internal surface 133 of the housing 111. The space forms an element bottom gap 161.

FIG. 12 shows further detail regarding the element bottom gap 161, The element bottom gap may extend along the entire bottom surface 133 of the cell 109. In other words, the element bottom gap 161 may be defined by dimensions spanning between respective cell walls 125 and the housing side walls 113, or between the housing end wall 117 and cell wall 125 and housing side walls 113, depending on the location of the cell 109 in the housing 111. The top dimension of the element bottom gap may be defined, in various embodiments, by the bottom of the element 142. In various embodiments, the element bottom gap 161 may be substantially rectangular-shaped.

The element bottom gap 161 between the bottom of the battery element 142 and housing base internal surface 133 may be created, in various embodiments, by a number of non-limiting factors. For example, the connecting straps 143 may be formed to hold the element 141 above the base internal surface 133 of the container cavity. In various embodiments, the element 252 hangs from a connecting strap 143 cast onto a plurality of lugs 157. In another example of embodiments, element stacking (providing grids, separators, etc. together for insertion into the cell) may allow for compression against the cell walls 125 and/or end walls 117 to maintain alignment. In other examples of embodiments, other suitable mechanisms may be used, for example, variances in the housing to create a ledge fir suspension of the element 141 in the cell 109.

The battery elements 141 may include one or more separators 159, In various embodiments, the separator 159 may have a relatively thin thickness compared to known flat-plate AGM batteries. For example, the separator 159 may be between approximately 0.5 to 1.5 mm in thickness. In various embodiments, the separator may be from 0.5 to 0.75 mm in thickness, or from 0.75 to 1 mm in thickness, or 1 to 1.25 mm in thickness, or 1.25 to 1.5 mm in thickness. These thicknesses may be measured at 10 kpa. The separator 159 may be seen, for example, in the cutaway of the cell element provided in FIG. 9. The separator 159 may, in various embodiments, wrap around a portion of a plate between a positive and negative plate. In an alternative embodiment, the separator 159 may be placed between the plates in a leaf-style arrangement. In an alternative embodiment, the separator 159 does not cover the bottom of the plate. In another alternative embodiment, the separator 159 envelopes the plate. The separator may therefore be interleaved, wrapped around, or enveloping one or more battery grids. In various embodiments, more than one separator may be used. In various embodiments, a separator is an absorbent glass mat (AGM). An AGM may also be used in combination with a separator.

The composition may advantageously allow for enhanced electrolyte uptake.

Cell Dividing Walls

In various embodiments, the housing 111 may include cell walls 125 which divide the housing into a plurality of cells. The cell walls 125 may, in various embodiments, include a cutout, recess, or notch 127. These features may be seen, according to various embodiments, in FIG. 2. The cutout 127 may be seen as provided in alternating locations in the cell walls 125. The location of the recess or cutout 127 may, in various embodiments, be positioned such that the location aligns with the location of the lugs 157 for the battery element. A close up of the recess or cutout 127 may be seen, according to various embodiments, in FIG. 4. In various embodiments, the cutout 127 may allow for a connecting strap 143 to pass from one battery element 141 to another. The connecting strap 143 may connect the battery elements 109 in series. The connecting strap 143 and/or end strap 145 may be cast on straps. This strap configuration may be shown, in various embodiments, in FIGS. 7 and 8.

The cutout 127 may be sized to allow for additional space between the lugs 157 or connecting strap 143. A space may be seen in FIG. 9, for example, as the lug width 158 is smaller than the cutout width 153. Likewise, as shown in FIG. 11, the connecting strap 143 width may be smaller than the cutout 127 width. In addition, the connecting strap 143 height may be smaller than a cutout 127 height. The space between the connecting straps 143 and the cutout 127 may contribute to an open housing design. The space 165 may be referred to as a "common headspace" which may be seen in further detail in FIG. 11. There, the connecting strap 143 may be seen as smaller than the space created by the cutout 127, leading to the open headspace 165 shown. In various embodiments, the headspace 165 may be likewise created between the cover 103 and the cell wall 125 having the cutout 127. The interaction between the housing cover 103 and walls 125 can also be seen in FIG. 10.

Open Housing

The housing 111 may, in various embodiments, allow for gasses and liquids to flow to a common space. This feature may be facilitated by, in various examples of embodiments, the cell dividing walls 125 having the recess or cutout 127 (e.g., the common headspace 165), as well as the curved internal side wall structure 130 and element side gap 155. The open housing or common space may allow for efficient release of gasses. For example, reduction in the number of valve assemblies 185 may be achieved. In addition, the pressure levels which may be facilitated may allow for superior performance over known batteries.

Exterior Walls—Overall Housing Structure

Figure 13A:
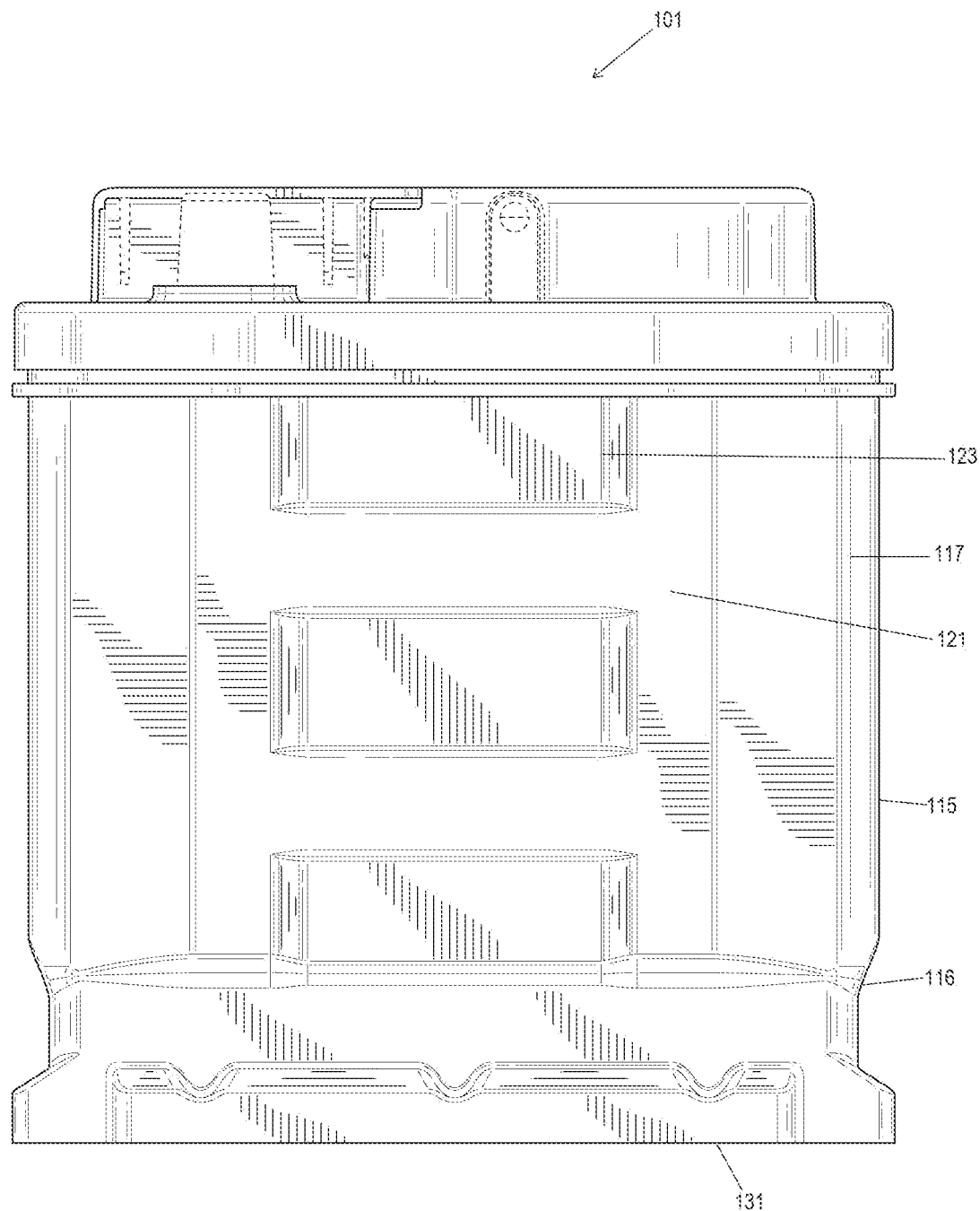
FIG. 13A shows a first end view of an exterior of a battery housing, according to various examples of embodiments.
Figure 13B:
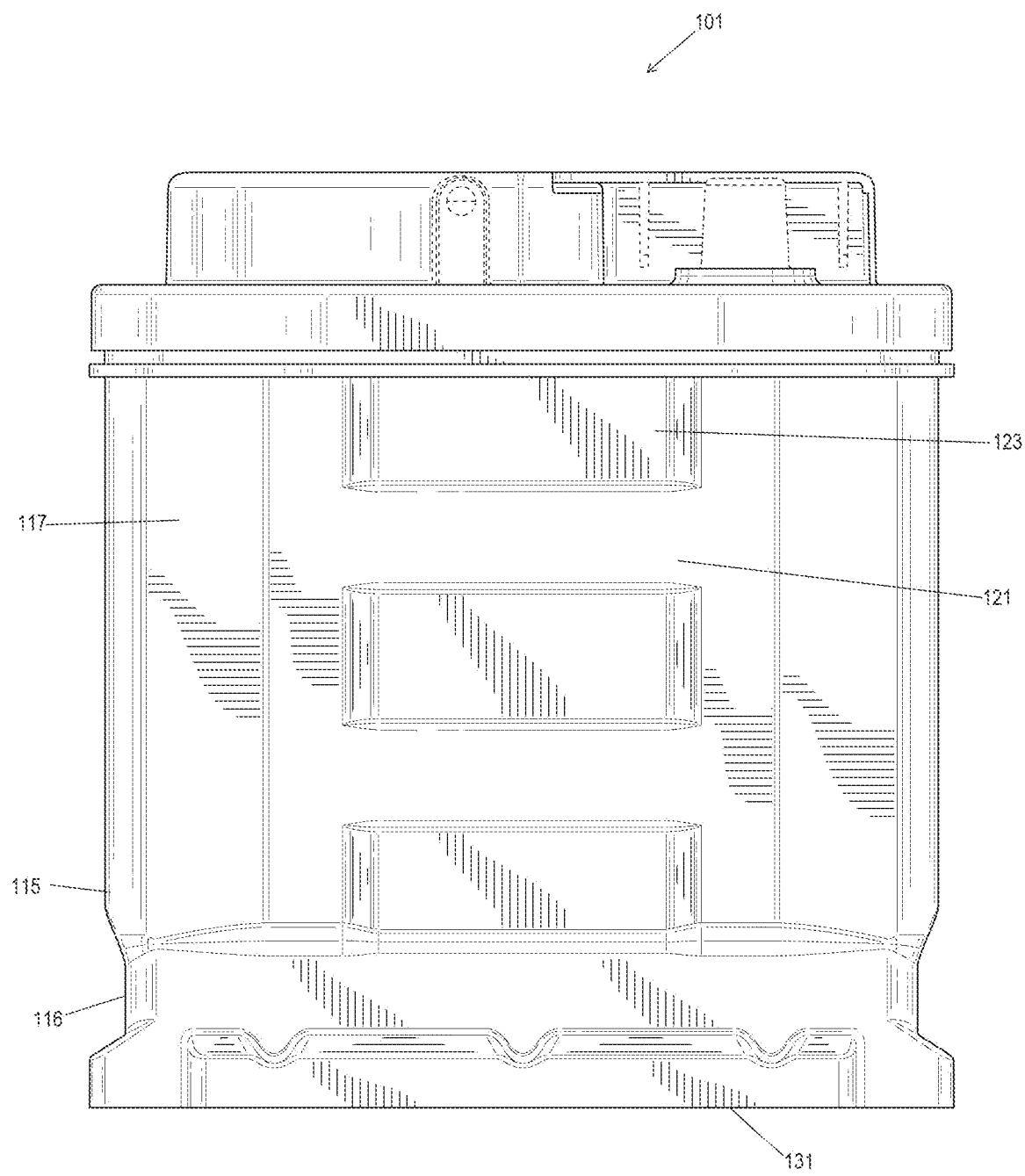
FIG. 13B shows a second end view of an exterior of a battery housing, according to various examples of embodiments.
Figure 15:
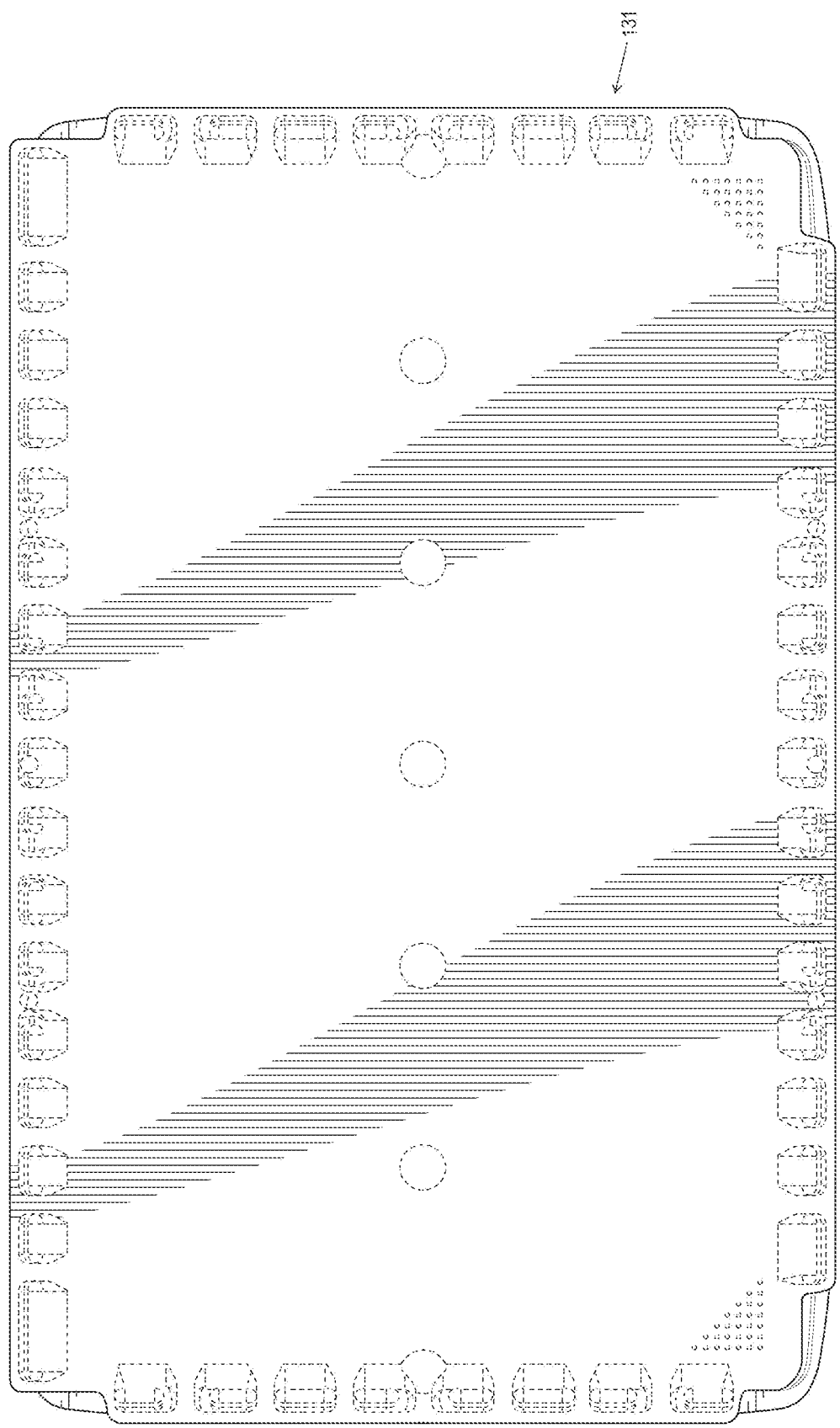
FIG. 15 shows a bottom view of an exterior of a battery housing, according to various examples of embodiments.

FIGS. 13A-15 show views of the exterior of the battery housing 111 including the cover 103. The battery 101 may be suitably sized for insertion into a vehicle. FIGS. 13A and 13B show a first and second end wall 115 of the housing 111, according to various examples of embodiments. These figures may include the enhanced end walls 117 discussed above. FIG. 14 shows a top (cover 103) and FIG. 15 shows a bottom or base 131 of the housing, according to various examples of embodiments. FIG. 1 shows an oblique view of a front of the housing 111, according to various examples of embodiments. The curved side walls 113 and enhanced end walls 117 can be seen, according to various embodiments. In addition, a housing lid or cover 103 may be seen. The housing lid or cover 103 may be coupled to the housing 111. This coupling may be by way of heat seal.

Battery Cover

Figure 16:
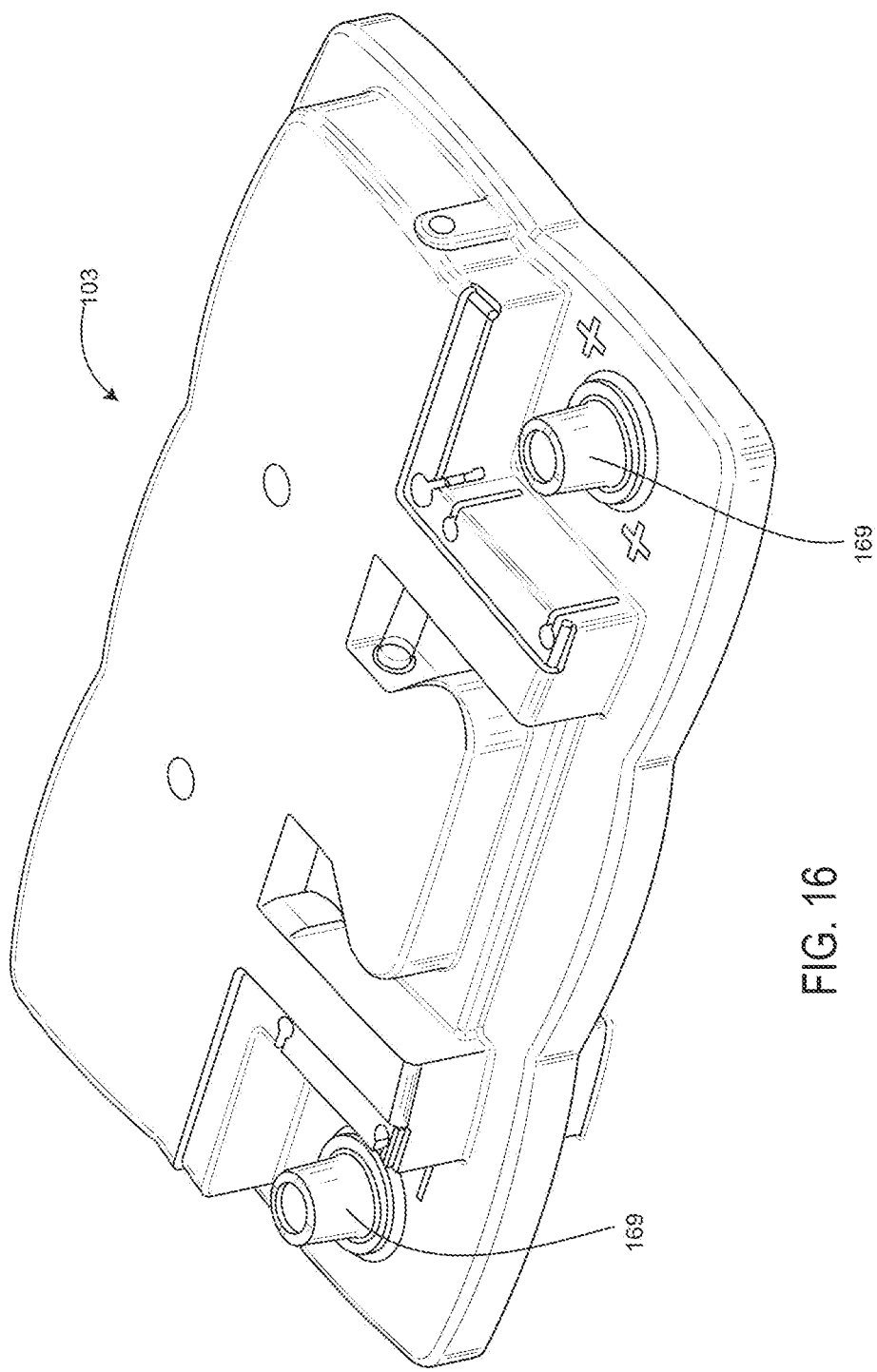
FIG. 16 shows a top view of a cover or top of a battery housing, according to various examples of embodiments.

A battery lid or cover 103 may be seen, in various examples of embodiments, in FIGS. 14 and 16-26. The battery cover 103 may include, in various examples of embodiments, two terminals 167 and a handle (a handle and terminal covers 105 may also be seen in FIG. 1). (Note, terminals 167 can be on a battery side wall or end wall and such embodiments should be contemplated as within the scope of this disclosure.) Referring to FIG. 16 (depicting a cover top side) and FIG. 17 (depicting a cover from a bottom side), bushings 169 for accepting the terminals 167 provided by the end straps 145 may be provided in a first and second location on the battery cover 103. In addition, referring to FIG. 17, two recesses 171 for accepting a first and second valve assembly 185 may likewise be provided on an underside of the battery cover 103.

As shown in FIG. 1 and FIG. 27A-E the battery lid or cover 103 may also include one or more terminal covers 105 or post protectors. The terminal covers or post protectors 105 may include one or more protrusions 189 which may be accepted by apertures provided in the battery cover (see, e.g., FIG. 25 according to various examples of embodiments). These covers 105 may be sized to accept a battery terminal post which is integrated into the battery lid or cover 103. The cover 105 may indicate whether the post is positive or negative, as well as protect the post from wear or discharge. A second protrusion type 191 may likewise be provided. While the post protectors 105 are shown as approximately rectangular, other shapes (e.g. triangular, round, polygons, etc.) should be contemplated as within the scope of this disclosure. The post protectors 105 may have one or more protrusions 189, 191 which may be accepted by recesses provided in the housing cover 103.

Though a certain number of features are shown in the drawings and described herein, more or less of these features may be contemplated as within the scope of this disclosure.

Figure 17:
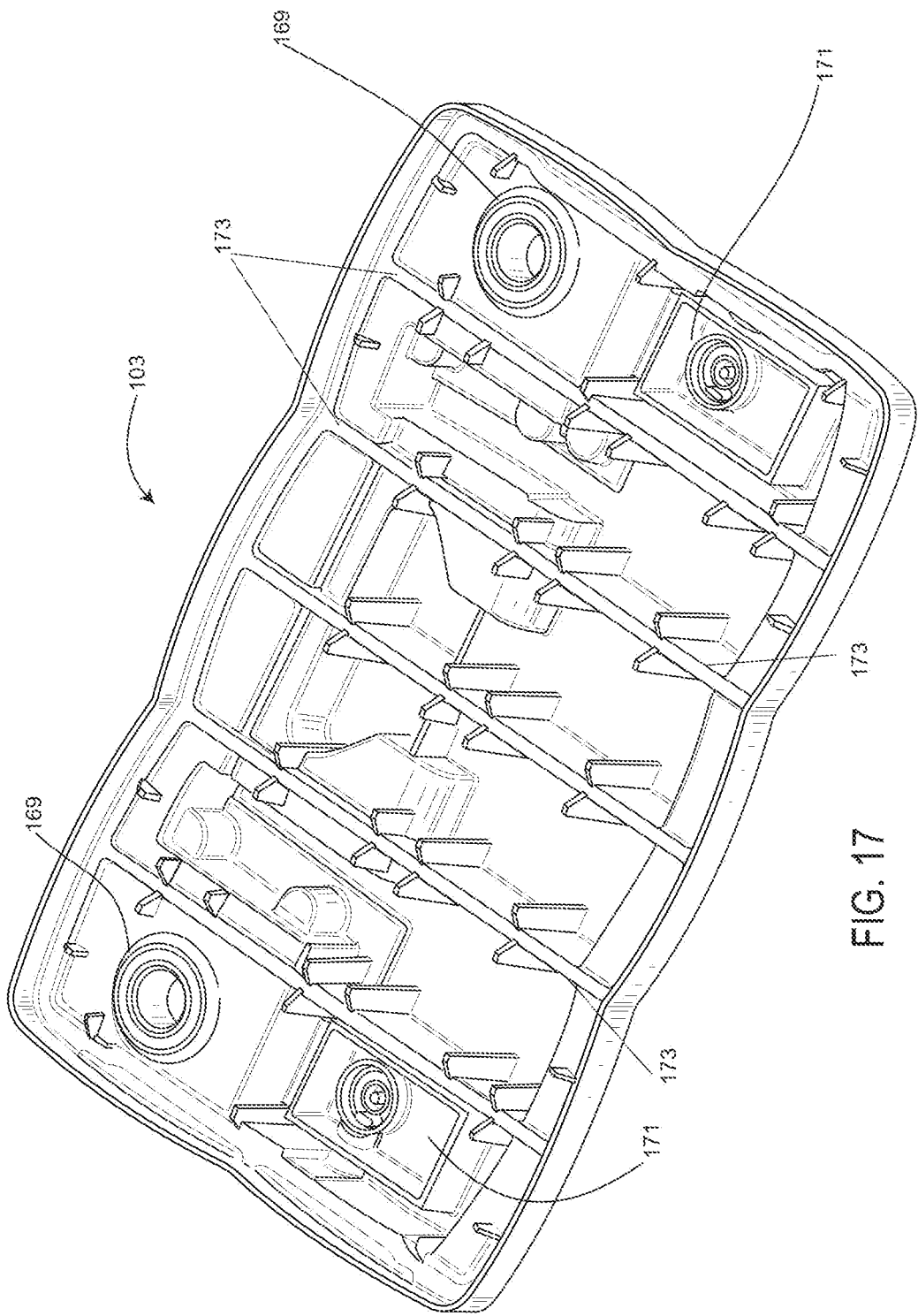
FIG. 17 shows a bottom or interior view of a cover or top of a battery housing, according to various examples of embodiments.
Figure 21:
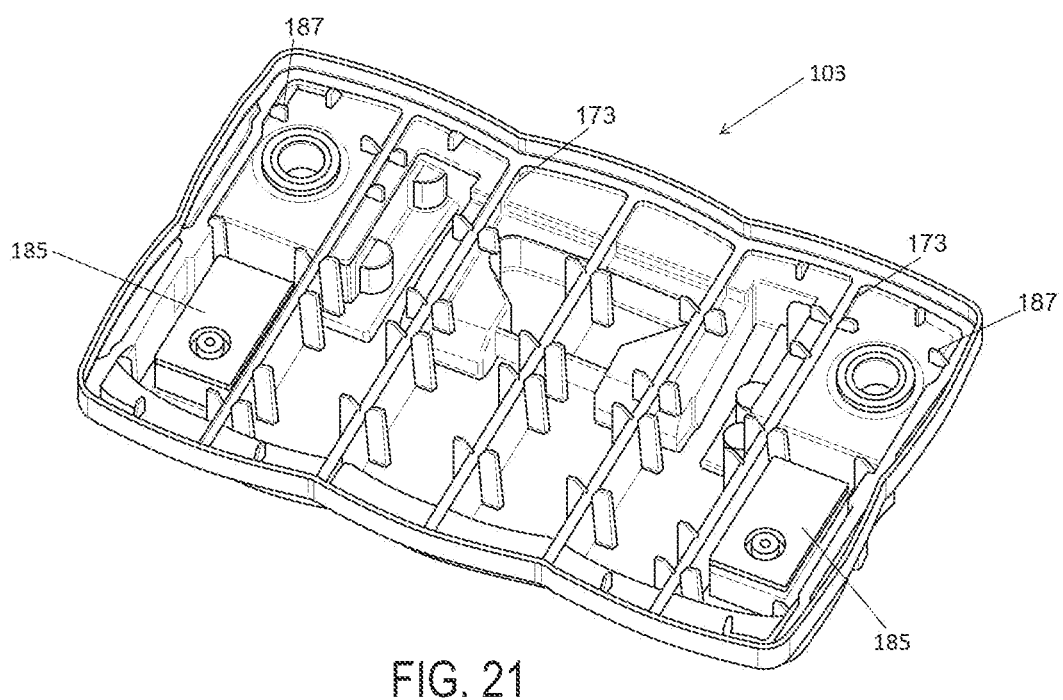
FIG. 21 shows a bottom or interior view of a battery housing cover of a battery housing, according to various examples of embodiments.
Figure 26:
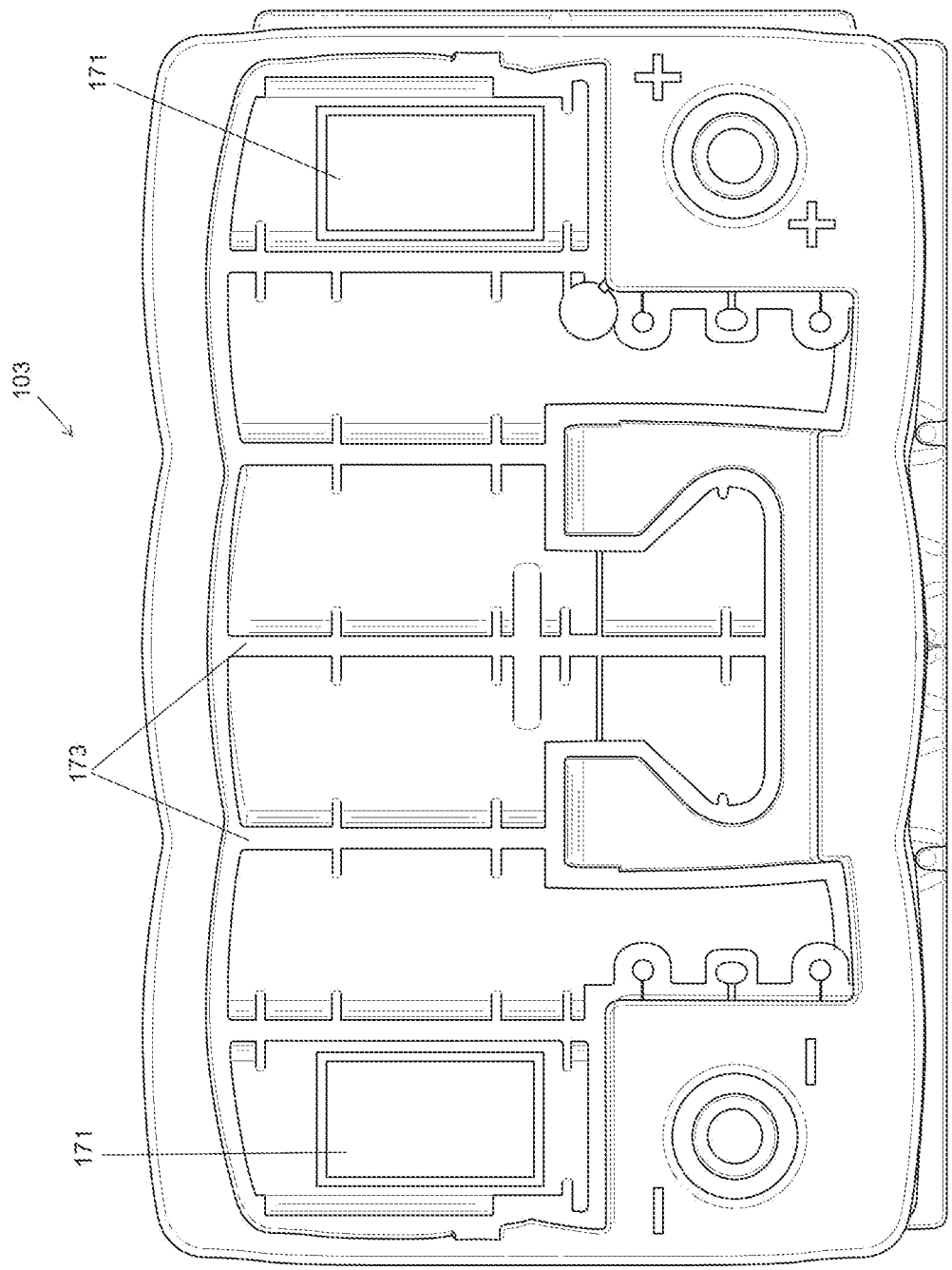
FIG. 26 shows a cross-section of a cover of a battery housing, according to various examples of embodiments.
Figure 27A:
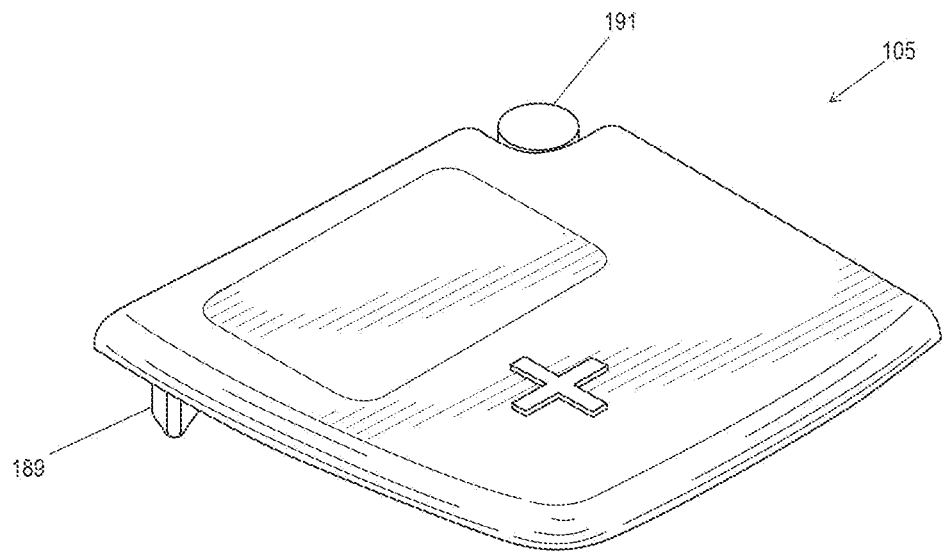
FIGS. 27A-E show a post protector for use with a cover of a battery housing according to various examples of embodiments.
Figure 27B:
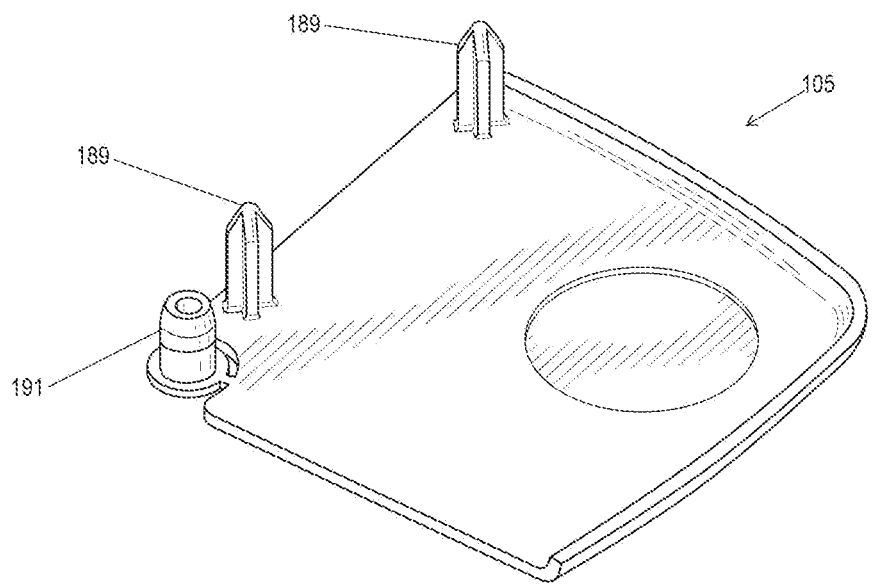
Figure 27C:
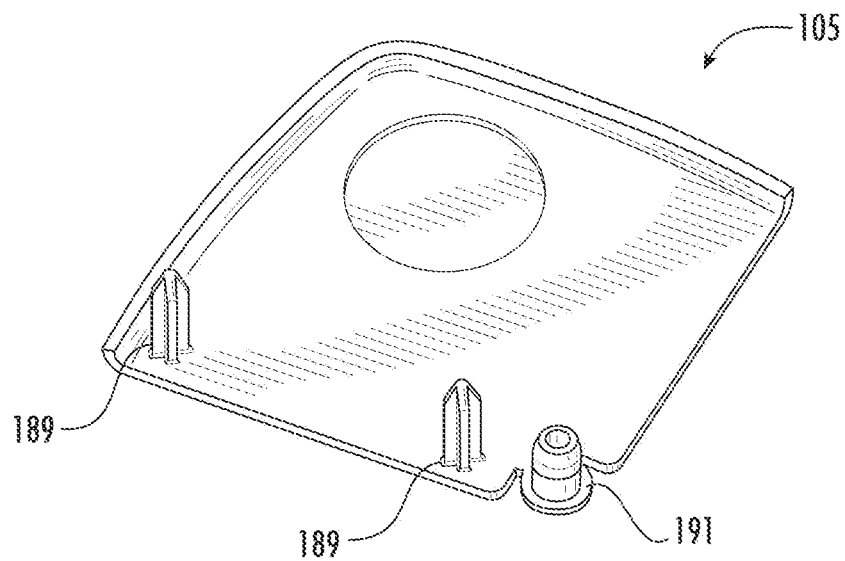
Figure 27D:
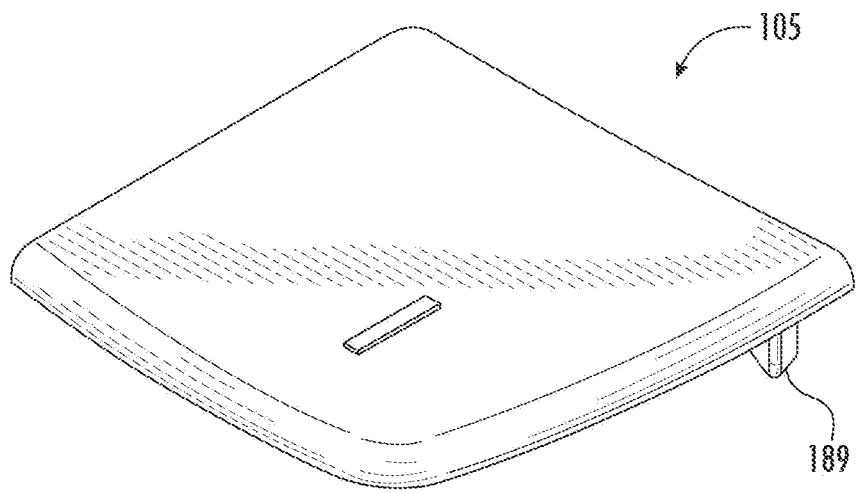
Figure 27E:
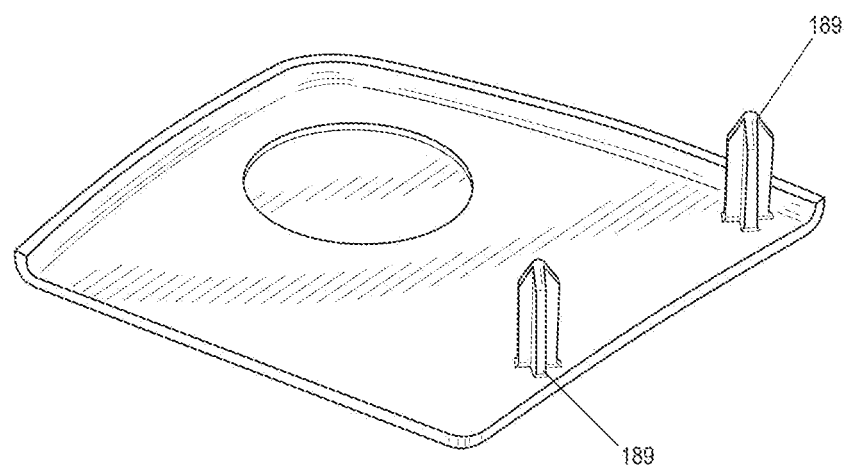

FIGS. 17, 21, and 26 shows an interior surface of the cover 103 which illustrates a number of walls 173 that may, in various embodiments, align with the aforementioned cell walls 125. Alignment may result in forming an aperture or headspace 165 with the cutout 127 (see FIG. 11). In addition, the cover 103 may, in various embodiments, feature one or more flame arrestor 181 elements. In various embodiments, the flame arrestor elements 181 may be part of the recess for the valve assembly 185.

Flame Arrestor and Valve Assembly

Figure 18:
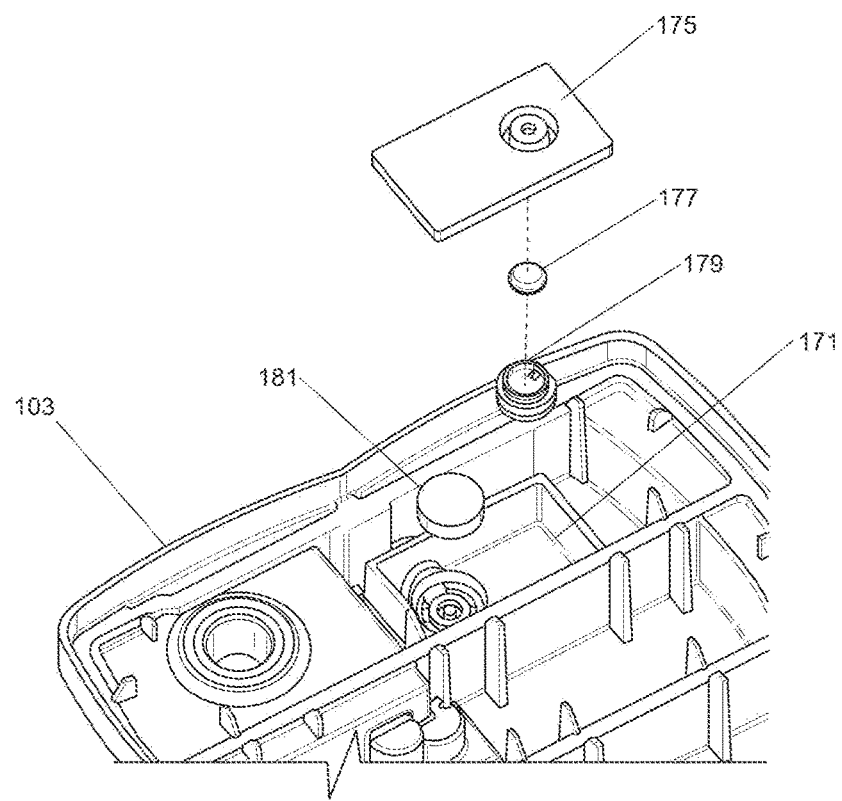
FIG. 18 shows a valve assembly and flame arrestor being provided within a battery housing top or cover, according to various examples of embodiments.
Figure 19:
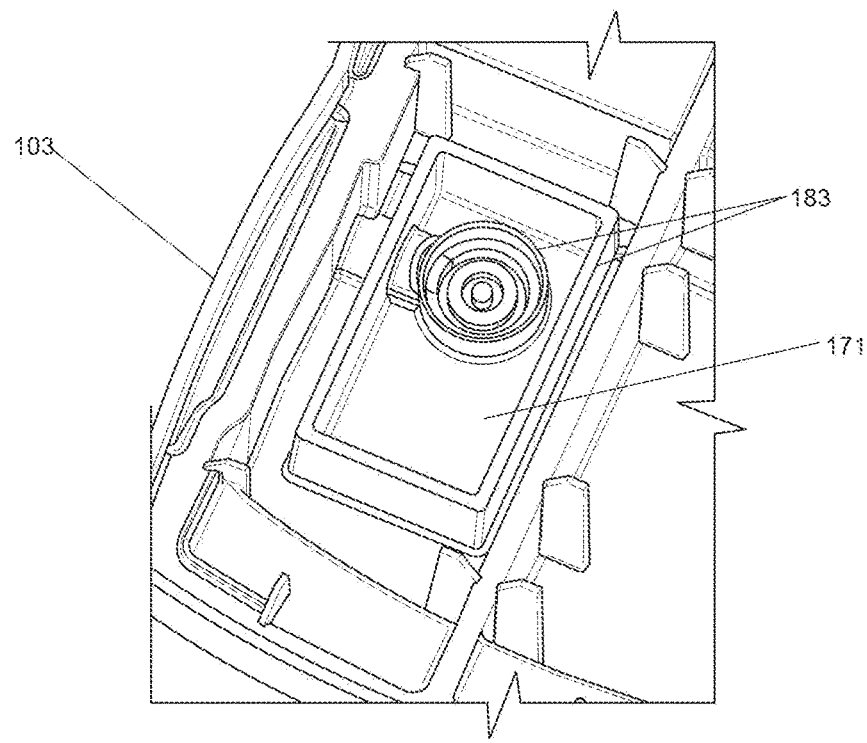
FIG. 19 shows an interior view of a battery housing top or cover, according to various examples of embodiments.
Figure 20:
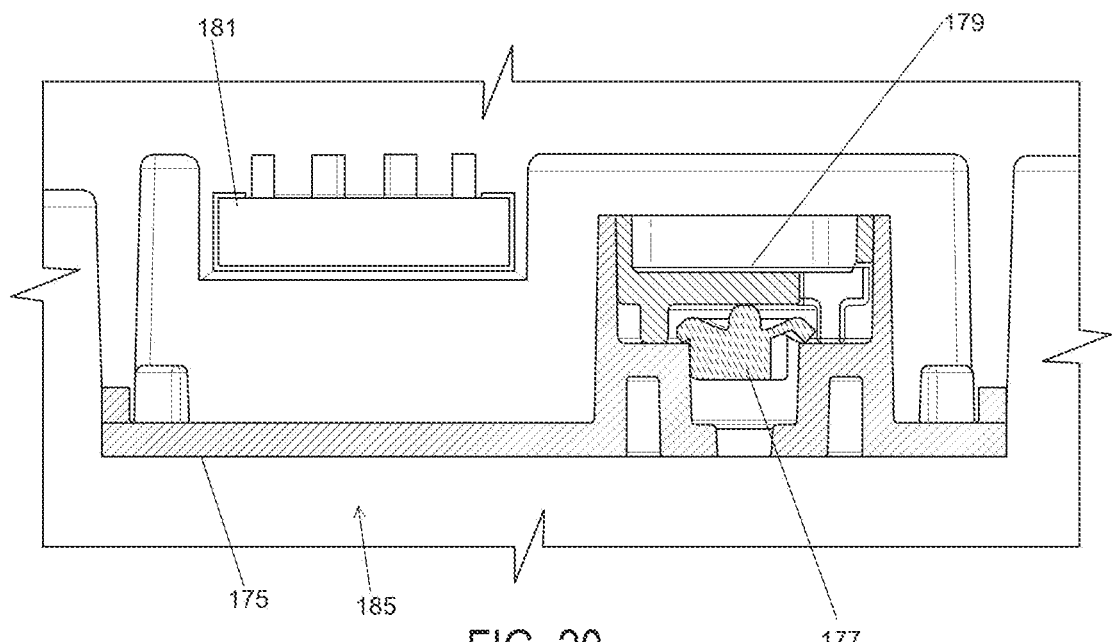
FIG. 20 shows a cross section view of a battery housing cover, according to various examples of embodiments.

In various embodiments, a flame arrestor 181 may be heat sealed to the recess 171 for the valve assembly 185; a valve cover 175 may be heat sealed as well. In various embodiments, the valve assembly 185 and flame arrestor 181 parts may be seen in FIGS. 18-21. FIG. 18 may, in various embodiments, show an exploded view of a valve assembly 185 (valve cover 175, valve 177, and valve holder 179) and flame arrestor elements 181 in the pocket or recess 171 of the cover. According to various embodiments, FIG. 19 shows the location of heat sealing surface 183 relative to the recess or pocket 171 and the flame arrestor 181 and valve assembly 185 elements. According to various embodiments, FIG. 20 shows the location of the flame arrestor 181 and valve assembly 185 including (valve cover 175, valve 177, and valve holder 179) in the cover pocket or recess 171. FIG. 21, according to various embodiments, shows two valve assemblies 185 installed onto the cover 103 of the housing 111.

Stacking Locator on Cover

Figure 22:
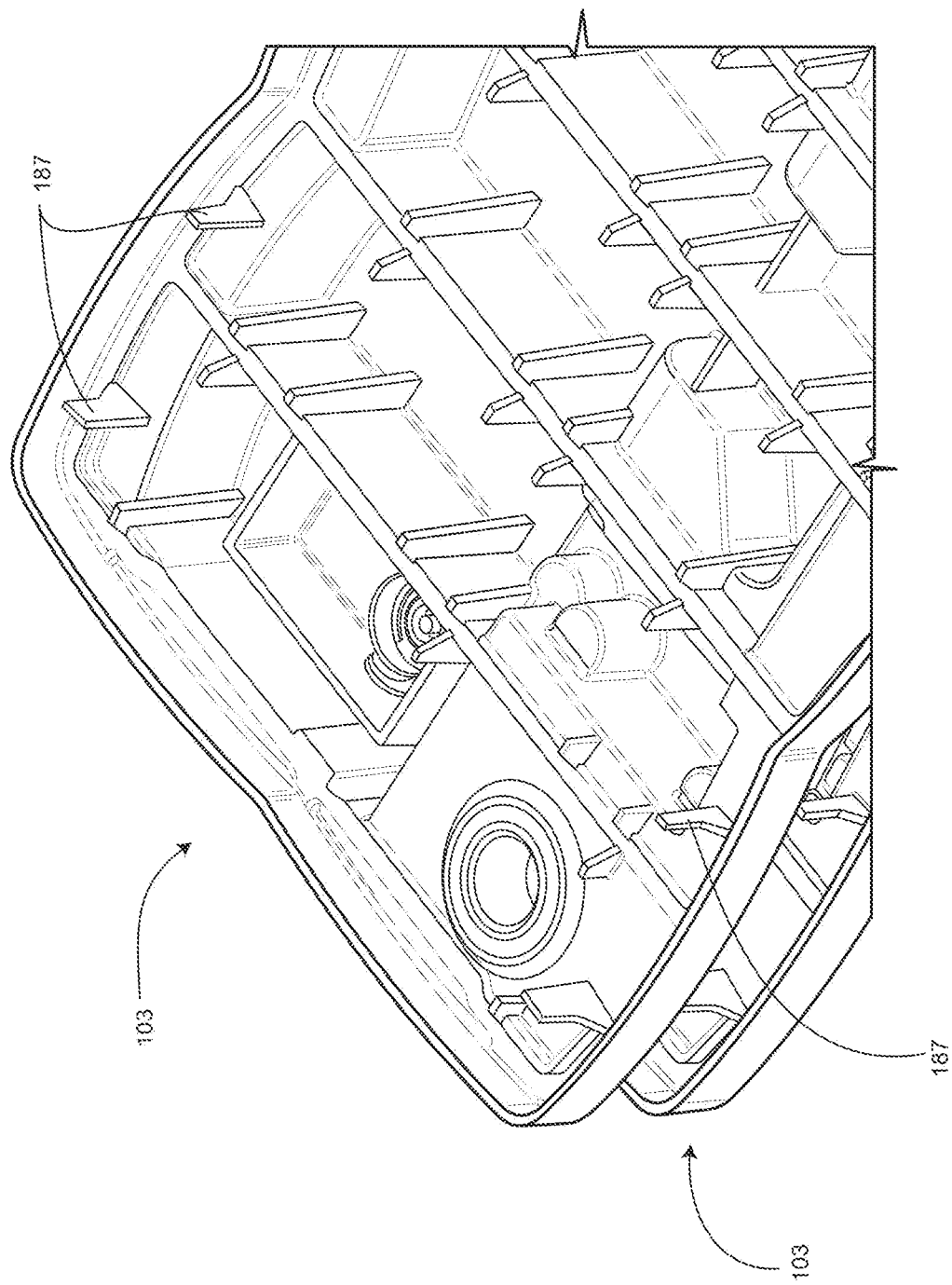
FIG. 22 shows a bottom or interior view of a cover of a battery housing, according to various examples of embodiments.
Figure 23:
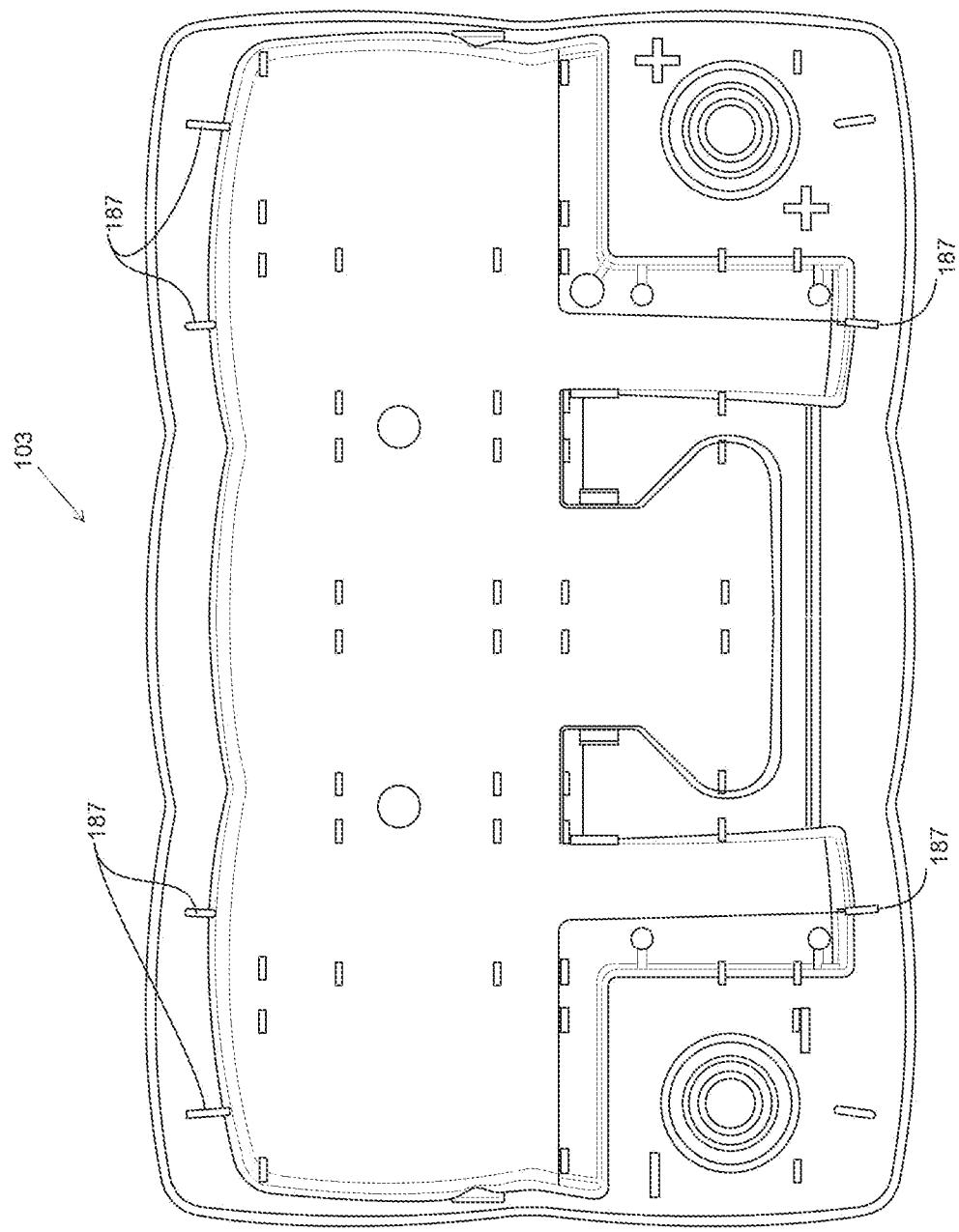
FIG. 23 shows a top or exterior view of a cover of a battery housing, according to various examples of embodiments.
Figure 24:
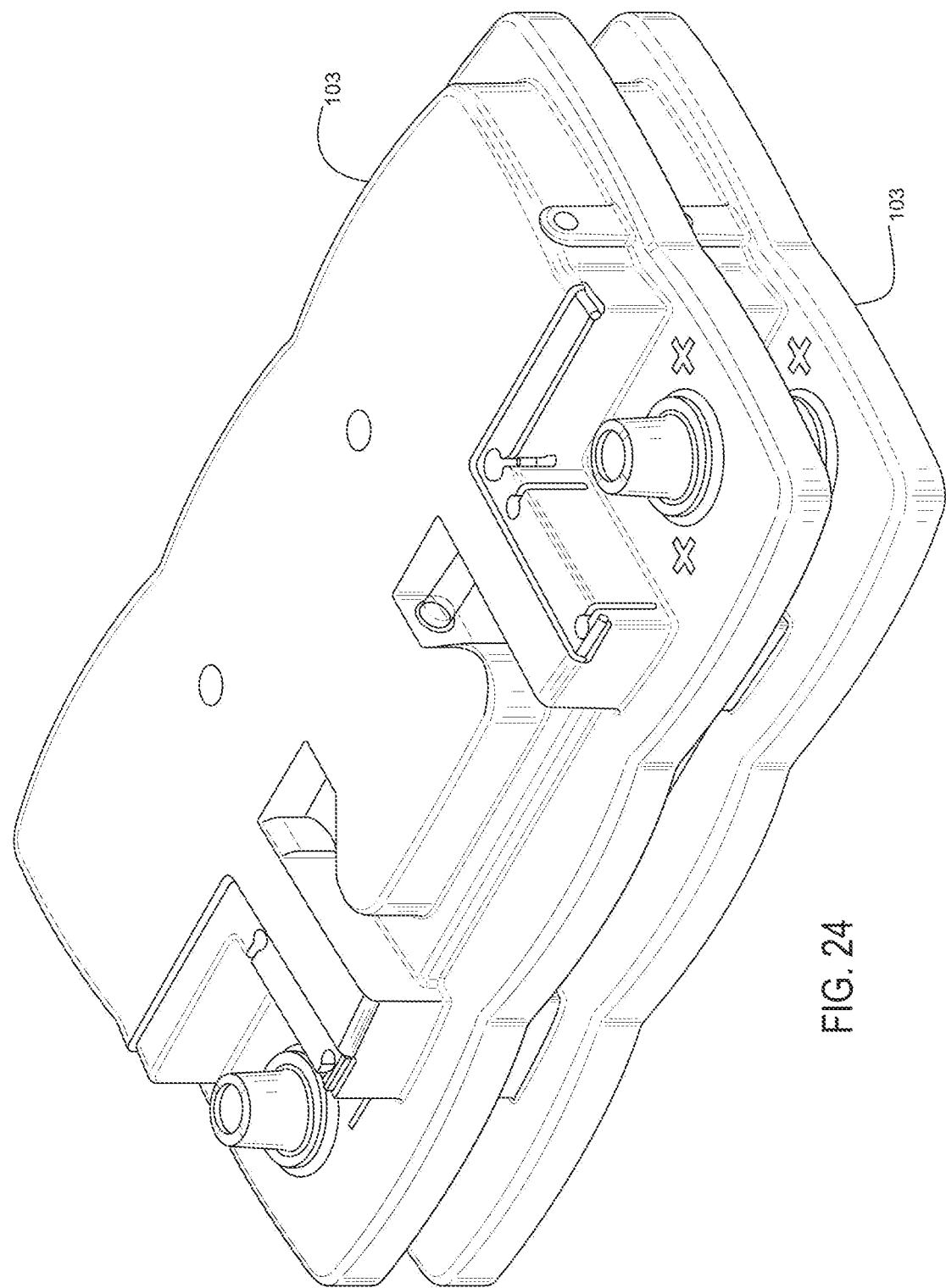
FIG. 24 shows a top or exterior view of two covers of a battery housing, according to various examples of embodiments.
Figure 25A:
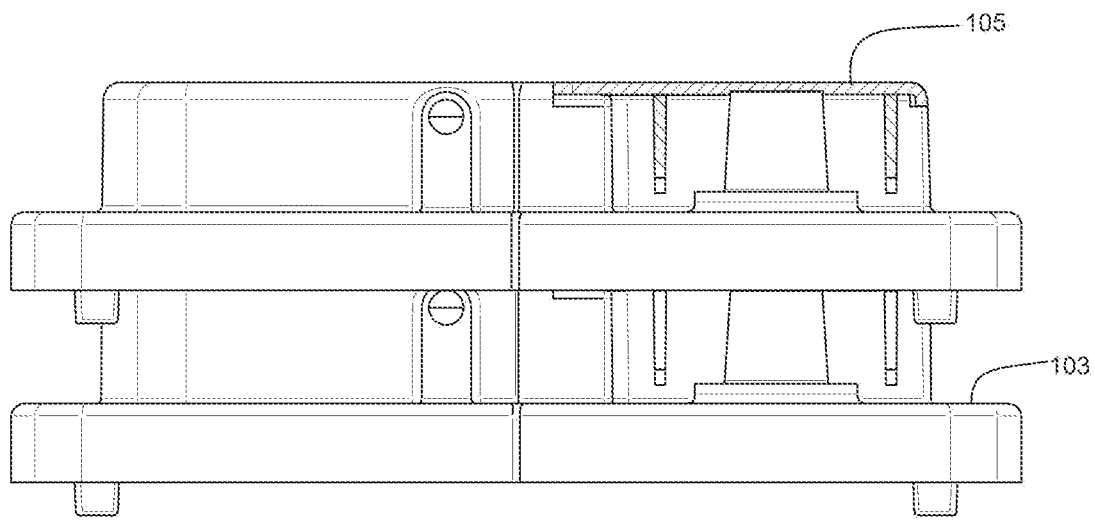
FIG. 25A shows another top or exterior view of two covers of a battery housing, according to various examples of embodiments.
Figure 25B:
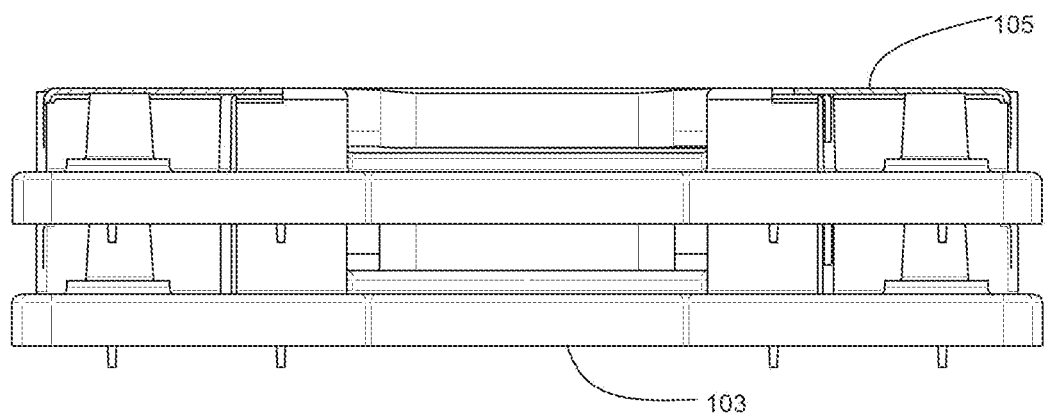
FIG. 25B shows another top or exterior view of two covers or tops of the battery housing, according to various examples of embodiments.

The cover 103 may, in various embodiments, include one or more stacking features 187. These features may comprise one or more, or a plurality of projections 187 positioned on one or both an interior and exterior of the cover 103. Referring to FIGS. 22 and 23, stacking locators 187 may be seen on an interior surface (FIG. 22) and/or exterior surface (FIG. 23) near one or more edges of the cover 103, according to various examples of embodiments. These projections 187 may facilitate the stacking of covers 103 atop one another, as illustrated in FIGS. 24, 25A, and 25B. In addition, guide ribs may provide support and rest on the cover 103 top surface. The stacking locator 187 may help lock the cover 103 from moving in an x and/or y direction, according to various examples of embodiments. FIG. 26 shows alternative embodiments of the cover. In various embodiments, the stacking locator may also be seen in FIGS. 21-22.

In various embodiments, the housing 111 may be comprised of a plastic, for example, a polypropylene resin. In various embodiments, the housing 111 may have corrugations for structural strength. In various embodiments, the material provided within the housing may be sized to be larger than the length of the housing itself. For example, the battery cell elements 141—including the one or more separators 159 and one or more grids—may have thicknesses such that the total element 141 is wider than the space allowed within the cell cavity, according to various embodiments. This thickness may be, in various embodiments, at the time of the battery assembly or during the life of the battery 101.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

The invention claimed is:

1. A battery comprising:
a base;
a first end wall, a second end wall, a first side wall, and a second side wall formed with the base;
a cell wall formed with the base, the first side wall, and the second side wall, the cell wall separating a first battery cell from a second battery cell; and
a first battery element and a second battery element disposed in the first battery cell and the second battery cell, respectively, the first battery element having a first side edge and a second side edge, the second battery element having a third side edge and a fourth side edge,
portions of the first side wall, the first side edge, and the cell wall defining a first gap,
portions of the second side wall, the second side edge, and the cell wall defining a second gap,
portions of the first side wall, the third side edge, and the cell wall defining a third gap, and
portions of the second side wall, the fourth side edge, and the cell wall defining a fourth gap, each of the first gap, second gap, third gap, and fourth gap being fluidly coupled by a common space between the first battery cell and the second battery cell.

2. The battery of claim 1, wherein the first side wall includes a first nonplanar portion, the second side wall includes a second nonplanar portion, and the cell wall bifurcates the first nonplanar portion and the second nonplanar portion.

3. The battery of claim 2, wherein the first nonplanar portion mirrors the second nonplanar portion.

4. The battery of claim 2, wherein the cell wall symmetrically bifurcates the first nonplanar portion and the second nonplanar portion.

5. The battery of claim 1, wherein the cell wall includes a cutout defining a path between the first battery cell and the second battery cell, wherein the common space includes the path.

6. The battery of claim 5, further comprising a connecting strap connecting the first battery element and the second battery element through the cutout, wherein the cutout has a cross-sectional area which is larger than a cross-sectional area of the connecting strap and the common space is defined in part by a difference between the cross-sectional area of the cutout and the cross-sectional area of the connecting strap.

7. The battery of claim 6, wherein the first battery element includes a first top edge and the second battery element includes a second top edge, and wherein the common space is defined at least in part by the first top edge and the second top edge, respectively.

8. The battery of claim 7, wherein the common space includes each of the first gap, second gap, third gap, and fourth gap, respectively.

9. The battery of claim 8, further including a cover, wherein the common space is further defined by the cover.

10. The battery of claim 1, wherein at least a portion of each of the first end wall and the second end wall, respectively, are reinforced.

11. The battery of claim 1, wherein at least a portion of each of the first side wall and the second side wall, respectively, are reinforced.

12. A battery comprising:
a base;
a first end wall, a second end wall, a first side wall, and a second side wall formed with the base and defining a volume;
a cell wall formed with the base, the first side wall, and the second side wall, the cell wall separating a first battery cell from a second battery cell;
a cover enclosing the volume, the cover defining a common headspace; and
a first battery element and a second battery element disposed in the first battery cell and the second battery cell, respectively, the first battery element having a first side edge and a second side edge, the second battery element having a third side edge and a fourth side edge,
portions of the first side wall, the first side edge, and the cell wall defining a first gap,
portions of the second side wall, the second side edge, and the cell wall defining a second gap,
portions of the first side wall, the third side edge, and the cell wall defining a third gap, and
portions of the second side wall, the fourth side edge, and the cell wall defining a fourth gap, each of the first gap, second gap, third gap, and fourth gap being fluidly coupled by the common headspace between the first battery cell and the second battery cell.

13. The battery of claim 12, wherein the cell wall is a first cell wall, and the battery includes a second cell wall and a third cell wall, each of the second and third cell walls, respectively, being formed with the base, the first side wall, and the second side wall, and wherein the second cell wall separates the second battery cell from a third battery cell and the third cell wall separates the third battery cell from a fourth battery cell.

14. The battery of claim 13, comprising a third battery element and a fourth battery element disposed in the third battery cell and the fourth battery cell, respectively, the third battery element having a fifth side edge and a sixth side edge, the fourth battery element having a seventh side edge and an eighth side edge, wherein
portions of the first side wall, the fifth side edge, and the third cell wall defining a fifth gap,
portions of the second side wall, the sixth side edge, and the third cell wall defining a sixth gap,
portions of the first side wall, the seventh side edge, and the third cell wall defining a seventh gap, and
portions of the second side wall, the eighth side edge, and the third cell wall defining an eighth gap, each of the fifth gap, sixth gap, seventh gap, and eighth gap being fluidly coupled by the common headspace between the third battery cell, and the fourth battery cell, respectively.

15. The battery of claim 13, wherein the first side wall includes a first nonplanar portion, the second side wall includes a second nonplanar portion, and the first cell wall bifurcates the first nonplanar portion and the second nonplanar portion, and wherein the first side wall includes a third nonplanar portion, the second side wall includes a fourth nonplanar portion, and the third cell wall bifurcates the third nonplanar portion and the fourth nonplanar portion.

16. The battery of claim 15, further including a fourth cell wall and a fifth cell wall, each of the fourth and fifth cell walls, respectively, being formed with the base, the first side wall, and the second side wall, and wherein the fourth cell wall separates the fourth battery cell from a fifth battery cell and the fifth cell wall separates the fifth battery cell from a sixth battery cell.

17. The battery of claim 16, comprising a fifth battery element and a sixth battery element disposed in the fifth battery cell and the sixth battery cell, respectively, the fifth battery element having a ninth side edge and a tenth side edge, the sixth battery element having an eleventh side edge and a twelfth side edge, wherein
portions of the first side wall, the ninth side edge, and the fifth cell wall defining a ninth gap,
portions of the second side wall, the tenth side edge, and the fifth cell wall defining a tenth gap,
portions of the first side wall, the eleventh side edge, and the fifth cell wall defining an eleventh gap, and
portions of the second side wall, the twelfth side edge, and the third cell wall defining a twelfth gap, each of the ninth gap, tenth gap, eleventh gap, and twelfth gap being fluidly coupled by the common headspace between the fifth battery cell, and the sixth battery cell, respectively.

18. The battery of claim 16, wherein the first side wall includes a fifth nonplanar portion, the second side wall includes a sixth nonplanar portion, and the fifth cell wall bifurcates the fifth nonplanar portion and the sixth nonplanar portion.

19. The battery of claim 16, wherein each of the first cell wall, second cell wall, third cell wall, fourth cell wall, and fifth cell wall include a cutout, the cutout defining a path between each of the first battery cell, second battery cell, third battery cell, fourth battery cell, fifth battery cell, and sixth battery cell, wherein the common headspace includes the path.

20. The battery of claim 19, further comprising a connecting strap connecting adjacent battery elements through the cutout, wherein the cutout has a cross-sectional area which is larger than a cross-sectional area of the connecting strap and the common headspace is defined at least in part by a difference between the cross-sectional area of the cutout and the cross-sectional area of the connecting strap.

\* \* \* \* \*